United States Patent
Wood et al.

(10) Patent No.: US 9,844,232 B2
(45) Date of Patent: Dec. 19, 2017

(54) SMOKING ARTICLE INSPECTION SYSTEM AND ASSOCIATED METHOD

(71) Applicant: R.J. Reynolds Tobacco Company, Winston-Salem, NC (US)

(72) Inventors: Gary Lee Wood, Rural Hall, NC (US); Derwin Hiatt, Walnut Cove, NC (US); Larry McCann, King, NC (US); Mike Shockley, Tobaccoville, NC (US); Eddie Nuckols, Mocksville, NC (US); David R. Hall, Kernersville, NC (US); Frank Brantley, Winston-Salem, NC (US); Isaac Martin, Lewisville, NC (US); Martin Sama, Tobaccoville, NC (US); Charles Reddell, Mount Airy, NC (US); Mike Whitley, Winston-Salem, NC (US)

(73) Assignee: R.J. Reynolds Tobacco Company, Winston-Salem, NC (US)

( * ) Notice: Subject to any disclaimer, the term of this patent is extended or adjusted under 35 U.S.C. 154(b) by 648 days.

(21) Appl. No.: 14/204,316

(22) Filed: Mar. 11, 2014

(65) Prior Publication Data
US 2015/0257437 A1     Sep. 17, 2015

(51) Int. Cl.
    H04N 7/18     (2006.01)
    A24C 5/34     (2006.01)
    G06T 7/00     (2017.01)

(52) U.S. Cl.
    CPC ............... *A24C 5/34* (2013.01); *A24C 5/3412* (2013.01); *G06T 7/001* (2013.01); *H04N 7/181* (2013.01); *G06T 2207/30128* (2013.01)

(58) Field of Classification Search
    CPC .......... H04N 7/181; H04N 7/18; G06T 7/001; G06T 2207/30128; A24C 5/34; A24C 5/3412
    (Continued)

(56) References Cited

U.S. PATENT DOCUMENTS

| 484,410 A | 10/1892 | Davis |
| 3,288,147 A | 11/1966 | Molins et al. |

(Continued)

FOREIGN PATENT DOCUMENTS

| CN | 1276999 | 12/2000 |
| CN | 1468068 | 1/2004 |

(Continued)

OTHER PUBLICATIONS

International Search Report and Written Opinion of the International Searching Authority for corresponding International Application No. PCT/US2015/019693 dated Jun. 26, 2015.

(Continued)

*Primary Examiner* — Trang U Tran
(74) *Attorney, Agent, or Firm* — Womble Bond Dickinson (US) LLP

(57) ABSTRACT

Smoking article inspection systems configured to inspect smoking articles are provided. The systems may include imaging devices configured to capture images of an exterior of the smoking article and an analysis unit configured to analyze the images captured by the imaging devices. The analysis unit may execute an edge detection tool configured to determine a position of the smoking article based on an edge location of the smoking article and a defect detection tool configured to determine whether the smoking article is defective after the position of the smoking article is determined. The imaging devices may be configured to capture images of the smoking articles during the assembly thereof. Thereby, the analysis unit may determine any operations during assembly causing damage to the smoking article from analysis of the images of the smoking article captured during assembly. Related methods are also provided.

22 Claims, 21 Drawing Sheets

(58) Field of Classification Search
USPC ..... 348/125, 89, 91, 129, 130, 132, 86, 128, 348/159; 131/280, 908, 905, 906, 29, 46
See application file for complete search history.

(56) References Cited

U.S. PATENT DOCUMENTS

| | | | |
|---|---|---|---|
| 3,301,454 A | 1/1967 | Wayne et al. | |
| 3,308,600 A | 3/1967 | Erdmann et al. | |
| 3,366,121 A | 1/1968 | Carty | |
| 3,398,675 A | 8/1968 | Potter et al. | |
| 3,424,172 A | 1/1969 | Neurath | |
| 3,428,049 A | 2/1969 | Leake et al. | |
| 3,444,517 A | 5/1969 | Rabinow | |
| 3,550,508 A | 12/1970 | Wartman, Jr. | |
| 3,550,598 A | 12/1970 | McGlumphy et al. | |
| 3,575,276 A | 4/1971 | Rupert | |
| 3,602,231 A | 8/1971 | Dock | |
| 3,685,521 A | 8/1972 | Dock | |
| 3,818,223 A | 6/1974 | Gibson et al. | |
| 3,884,246 A | 5/1975 | Walker | |
| 3,915,176 A | 10/1975 | Heitmann et al. | |
| 4,053,056 A | 10/1977 | Day | |
| 4,083,460 A | 4/1978 | Venturi | |
| 4,171,739 A | 10/1979 | Yamato | |
| 4,174,719 A | 11/1979 | Martin et al. | |
| 4,238,993 A | 12/1980 | Brand et al. | |
| 4,280,187 A | 7/1981 | Reuland et al. | |
| 4,281,670 A | 8/1981 | Heitmann et al. | |
| 4,281,671 A | 8/1981 | Bynre et al. | |
| 4,284,088 A | 8/1981 | Brand et al. | |
| 4,291,713 A | 9/1981 | Frank | |
| 4,294,353 A | 10/1981 | Focke et al. | |
| RE30,964 E | 6/1982 | Butner et al. | |
| 4,403,620 A | 9/1983 | Joseph et al. | |
| 4,445,520 A | 5/1984 | Knight et al. | |
| 4,474,190 A | 10/1984 | Brand | |
| 4,534,463 A | 8/1985 | Bouchard | |
| 4,574,816 A | 3/1986 | Rudszinat | |
| 4,639,592 A * | 1/1987 | Heitmann ............ | G01N 21/952 250/223 B |
| 4,715,497 A | 12/1987 | Focke et al. | |
| 4,736,754 A | 4/1988 | Heitmann et al. | |
| 4,781,203 A | 11/1988 | La Hue | |
| 4,807,809 A | 2/1989 | Pryor et al. | |
| 4,811,745 A | 3/1989 | Cohen et al. | |
| 4,844,100 A | 7/1989 | Holznagel | |
| 4,850,301 A | 7/1989 | Greene, Jr. et al. | |
| 4,852,734 A | 8/1989 | Allen et al. | |
| 4,862,905 A | 9/1989 | Green, Jr. et al. | |
| 4,878,506 A | 11/1989 | Pinck et al. | |
| 4,889,144 A | 12/1989 | Tateno et al. | |
| 4,920,990 A | 5/1990 | Lawrence et al. | |
| 4,925,602 A | 5/1990 | Hill et al. | |
| 5,012,823 A | 5/1991 | Keritsis et al. | |
| 5,012,829 A | 5/1991 | Thesing et al. | |
| 5,025,814 A | 6/1991 | Raker | |
| 5,060,664 A | 10/1991 | Siems et al. | |
| 5,060,665 A | 10/1991 | Heitmann | |
| 5,074,320 A | 12/1991 | Jones, Jr. et al. | |
| 5,101,609 A | 4/1992 | Cook | |
| 5,101,839 A | 4/1992 | Jakob et al. | |
| 5,105,838 A | 4/1992 | White et al. | |
| 5,131,416 A | 7/1992 | Gentry | |
| 5,139,140 A | 8/1992 | Burrows et al. | |
| 5,156,169 A | 10/1992 | Holmes et al. | |
| 5,159,944 A | 11/1992 | Arzonico et al. | |
| 5,167,244 A | 12/1992 | Kjerstad | |
| 5,191,906 A | 3/1993 | Myracle, Jr. | |
| 5,220,930 A | 6/1993 | Gentry | |
| 5,225,277 A | 7/1993 | Takegawa et al. | |
| 5,235,649 A * | 8/1993 | Reda ..................... | B65B 19/30 209/536 |
| 5,240,117 A | 8/1993 | Focke et al. | |
| 5,271,419 A | 12/1993 | Arzonico et al. | |
| 5,333,729 A | 8/1994 | Wolfe | |
| 5,353,357 A | 10/1994 | Longest et al. | |
| 5,360,023 A | 11/1994 | Blakeley et al. | |
| 5,387,285 A | 2/1995 | Rivers | |
| 5,396,909 A | 3/1995 | Gentry et al. | |
| 5,414,270 A * | 5/1995 | Henderson ............ | G01N 21/952 209/236 |
| 5,432,600 A | 7/1995 | Grollimund et al. | |
| 5,472,002 A | 12/1995 | Covarrubias | |
| 5,476,108 A | 12/1995 | Dominguez et al. | |
| 5,515,159 A | 5/1996 | Sites et al. | |
| 5,588,068 A | 12/1996 | Longest et al. | |
| 5,596,187 A * | 1/1997 | Di Stefano .......... | A24C 5/3412 250/222.1 |
| 5,660,382 A | 8/1997 | Meier | |
| 5,718,250 A | 2/1998 | Banerjee et al. | |
| 5,740,902 A | 4/1998 | Spatafora | |
| 5,898,104 A | 4/1999 | Rohrssen et al. | |
| 5,938,018 A | 8/1999 | Keaveney et al. | |
| 5,977,780 A | 11/1999 | Herrmann | |
| 6,020,969 A | 2/2000 | Struckhoff et al. | |
| 6,054,665 A | 4/2000 | Focke et al. | |
| 6,075,882 A * | 6/2000 | Mullins ................ | A24C 5/3412 131/280 |
| 6,117,455 A | 9/2000 | Takada et al. | |
| 6,158,193 A | 12/2000 | Focke et al. | |
| 6,169,600 B1 * | 1/2001 | Ludlow ................ | A24C 5/3412 131/905 |
| 6,181,372 B1 * | 1/2001 | Neri ..................... | A24C 5/3412 131/280 |
| 6,213,128 B1 | 4/2001 | Smith et al. | |
| 6,229,115 B1 | 5/2001 | Vos et al. | |
| 6,246,778 B1 | 6/2001 | Moore | |
| 6,360,751 B1 | 3/2002 | Fagg et al. | |
| 6,384,359 B1 | 5/2002 | Belcastro et al. | |
| 6,385,333 B1 | 5/2002 | Puckett et al. | |
| 6,437,317 B1 | 8/2002 | Focke et al. | |
| 6,537,186 B1 | 3/2003 | Veluz | |
| 6,612,429 B2 | 9/2003 | Dennen | |
| 6,647,870 B2 | 11/2003 | Kohno | |
| 6,647,878 B2 | 11/2003 | Blau et al. | |
| 6,726,006 B2 | 4/2004 | Funderburk et al. | |
| 6,736,261 B1 | 5/2004 | Thomas et al. | |
| 6,761,174 B2 | 7/2004 | Jupe et al. | |
| 6,779,530 B2 | 8/2004 | Kraker | |
| 6,813,961 B2 | 11/2004 | Stiller et al. | |
| 6,848,449 B2 | 2/2005 | Kitao et al. | |
| 6,904,917 B2 | 6/2005 | Kitao et al. | |
| 7,074,170 B2 | 7/2006 | Lanier, Jr. et al. | |
| 7,115,085 B2 | 10/2006 | Deal | |
| 7,210,486 B2 | 5/2007 | Hartmann | |
| 7,234,471 B2 | 6/2007 | Fitzgerald et al. | |
| 7,237,559 B2 | 7/2007 | Ashcraft et al. | |
| 7,240,678 B2 | 7/2007 | Crooks et al. | |
| 7,275,548 B2 | 10/2007 | Hancock et al. | |
| 7,281,540 B2 | 10/2007 | Barnes et al. | |
| 7,296,578 B2 | 11/2007 | Read, Jr. | |
| 7,325,382 B2 | 2/2008 | Nelson et al. | |
| 7,434,585 B2 | 10/2008 | Holmes | |
| 7,479,098 B2 | 1/2009 | Thomas et al. | |
| 7,565,818 B2 | 7/2009 | Thomas et al. | |
| 7,578,298 B2 | 8/2009 | Karles et al. | |
| 7,654,945 B2 | 2/2010 | Deal | |
| 7,740,019 B2 | 6/2010 | Nelson et al. | |
| 7,744,922 B2 | 6/2010 | Mane et al. | |
| 7,784,356 B2 | 8/2010 | Spiers et al. | |
| 7,833,146 B2 | 11/2010 | Deal | |
| 7,836,895 B2 | 11/2010 | Dube et al. | |
| 7,861,728 B2 | 1/2011 | Holton, Jr. et al. | |
| 7,972,254 B2 | 7/2011 | Stokes et al. | |
| 8,142,339 B2 | 3/2012 | Deal | |
| 8,186,359 B2 | 5/2012 | Ademe et al. | |
| 8,262,550 B2 | 9/2012 | Barnes et al. | |
| 8,308,623 B2 | 11/2012 | Nelson et al. | |
| 2001/0032932 A1 | 10/2001 | Focke | |
| 2002/0185141 A1 | 12/2002 | Heide | |
| 2003/0136419 A1 | 7/2003 | Muller | |
| 2003/0137312 A1 | 7/2003 | Cerati et al. | |
| 2003/0145866 A1 | 8/2003 | Hartmann | |
| 2003/0178036 A1 | 9/2003 | Demmer et al. | |

(56) References Cited

U.S. PATENT DOCUMENTS

| | | |
|---|---|---|
| 2003/0206023 A1 | 11/2003 | Herrmann |
| 2004/0129281 A1 | 7/2004 | Hancock et al. |
| 2004/0141174 A1 | 7/2004 | Focke et al. |
| 2004/0217023 A1 | 11/2004 | Fagg et al. |
| 2004/0256253 A1 | 12/2004 | Henson et al. |
| 2004/0261807 A1 | 12/2004 | Dube et al. |
| 2005/0016556 A1 | 1/2005 | Ashcraft et al. |
| 2005/0039764 A1 | 2/2005 | Barnes et al. |
| 2005/0066986 A1 | 3/2005 | Nestor et al. |
| 2005/0075754 A1 | 4/2005 | Zeitler et al. |
| 2005/0076929 A1 | 4/2005 | Fitzgerald et al. |
| 2005/0112228 A1 | 5/2005 | Smith et al. |
| 2005/0150786 A1 | 7/2005 | Mitten et al. |
| 2006/0169295 A1 | 8/2006 | Draghetti |
| 2006/0207616 A1 | 9/2006 | Hapke et al. |
| 2006/0243611 A1 | 11/2006 | Wu |
| 2006/0272655 A1 | 12/2006 | Thomas et al. |
| 2007/0056600 A1 | 3/2007 | Coleman, III et al. |
| 2007/0091326 A1 | 4/2007 | Schroeder et al. |
| 2007/0102015 A1 | 5/2007 | Villarinho |
| 2007/0144542 A1 | 6/2007 | Bencivenni et al. |
| 2007/0215167 A1 | 9/2007 | Crooks et al. |
| 2007/0246055 A1 | 10/2007 | Oglesby |
| 2008/0029118 A1 | 2/2008 | Nelson et al. |
| 2008/0093234 A1 | 4/2008 | Jones et al. |
| 2008/0099353 A1 | 5/2008 | Parsons et al. |
| 2008/0142028 A1 | 6/2008 | Fagg |
| 2008/0179204 A1 | 7/2008 | Lutzig |
| 2008/0202540 A1 | 8/2008 | Carter et al. |
| 2009/0050163 A1 | 2/2009 | Hartmann et al. |
| 2009/0066948 A1 | 3/2009 | Karpowicz et al. |
| 2009/0090372 A1 | 4/2009 | Thomas et al. |
| 2009/0120449 A1 | 5/2009 | Tindall |
| 2009/0194118 A1 | 8/2009 | Ademe et al. |
| 2010/0059074 A1 | 3/2010 | Brantley et al. |
| 2010/0101589 A1 | 4/2010 | Nelson et al. |
| 2010/0184576 A1 | 7/2010 | Prestia et al. |
| 2010/0236561 A1 | 9/2010 | Barnes et al. |
| 2010/0293106 A1 | 11/2010 | Rhoads et al. |
| 2010/0294290 A1 | 11/2010 | Zhang |
| 2011/0053745 A1 | 3/2011 | Iliev et al. |
| 2011/0067976 A1 | 3/2011 | Pelagatti |
| 2011/0162662 A1 | 7/2011 | Nikolov et al. |
| 2011/0162665 A1 | 7/2011 | Burov et al. |
| 2011/0169942 A1 | 7/2011 | Brantley et al. |
| 2011/0230320 A1 | 9/2011 | Stokes et al. |
| 2011/0271968 A1 | 11/2011 | Carpenter et al. |
| 2012/0037546 A1 | 2/2012 | Dixon et al. |
| 2012/0055493 A1 | 3/2012 | Novak, III et al. |
| 2012/0077658 A1 | 3/2012 | Nikolov et al. |
| 2012/0080043 A1 | 4/2012 | Naenen et al. |
| 2012/0120229 A1 | 5/2012 | Brantley et al. |
| 2012/0245006 A1 | 9/2012 | Henley et al. |
| 2012/0245007 A1 | 9/2012 | Henley et al. |
| 2013/0085052 A1 | 4/2013 | Novak, III et al. |
| 2013/0096711 A1 | 4/2013 | Gates et al. |

FOREIGN PATENT DOCUMENTS

| | | |
|---|---|---|
| CN | 1642724 | 7/2005 |
| CN | 1939165 | 4/2007 |
| CN | 101257809 | 9/2008 |
| CN | 102669812 A | 9/2012 |
| DE | 10238906 | 3/2004 |
| DE | 10 2008 062 370 | 6/2010 |
| EP | 0 292 949 | 11/1988 |
| EP | 0 704 172 | 4/1996 |
| EP | 1 669 755 | 6/2006 |
| EP | 1 754 419 | 2/2007 |
| EP | 1 759 063 | 3/2007 |
| EP | 1 767 107 | 3/2007 |
| EP | 1 916 188 | 4/2008 |
| EP | 2 199 883 | 6/2010 |
| EP | 2 243 384 | 10/2010 |
| GB | 1 058 343 | 2/1967 |
| GB | 2 020 158 | 11/1979 |
| GB | 1042000 | 9/1996 |
| JP | 9325123 | 12/1997 |
| JP | 2001-190262 | 7/2001 |
| JP | 2003-219855 | 8/2003 |
| JP | 2004-504825 | 2/2004 |
| WO | WO 01/79092 | 10/2001 |
| WO | WO 03/009711 | 2/2003 |
| WO | WO 03/047836 | 6/2003 |
| WO | WO 03/082558 | 10/2003 |
| WO | WO 2005/113386 | 12/2005 |
| WO | WO 2006/064371 | 6/2006 |
| WO | WO 2006/092962 | 9/2006 |
| WO | WO 2007/028957 | 3/2007 |
| WO | WO 2007/038053 | 4/2007 |
| WO | WO 2013/145163 | 10/2013 |

OTHER PUBLICATIONS

Davis et al., *Tobacco Production, Chemistry and Technology*, 1999, pp. 440-460, Blackwell Science, Inc., Malden, MA.

Johnson, *Development of Cigarette Components to Meet Industry Needs*, 52$^{nd}$ T.S.R.C., Sep. 1998.

mini-Z™ Terahertz Time Domain Spectrometer Brochure http://dl.z-thz.com/brochures/mini-ZRev5.pdf downloaded from website on Jan. 16. 2013.

First Chinese Office Action for Application No. 201580022271.X dated Aug. 2. 2017.

\* cited by examiner

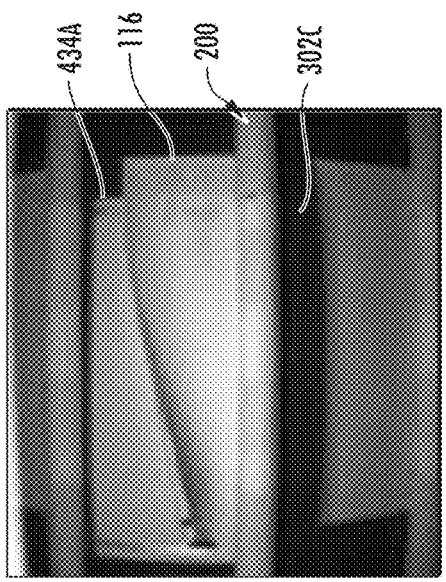
FIG. 16A
FIG. 16B
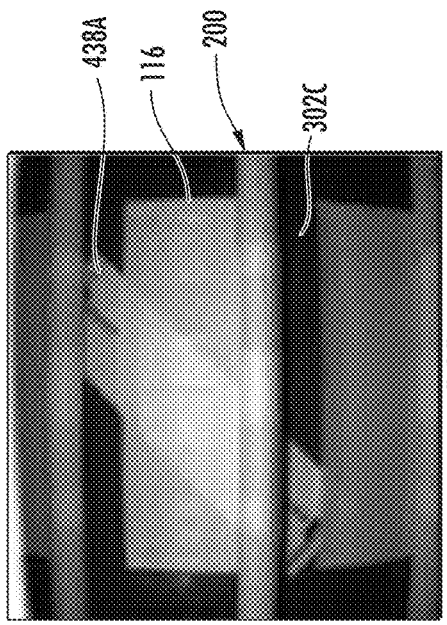
FIG. 16C
FIG. 16D
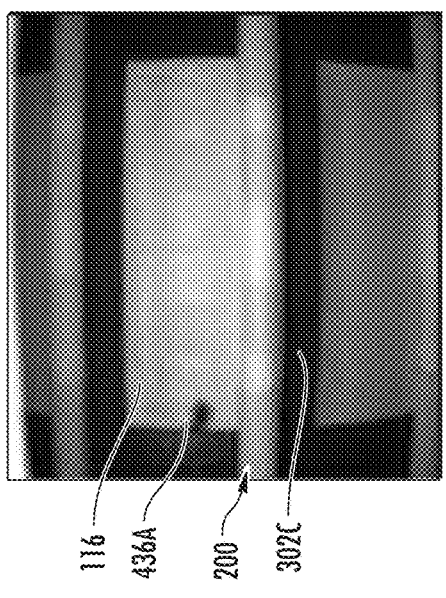

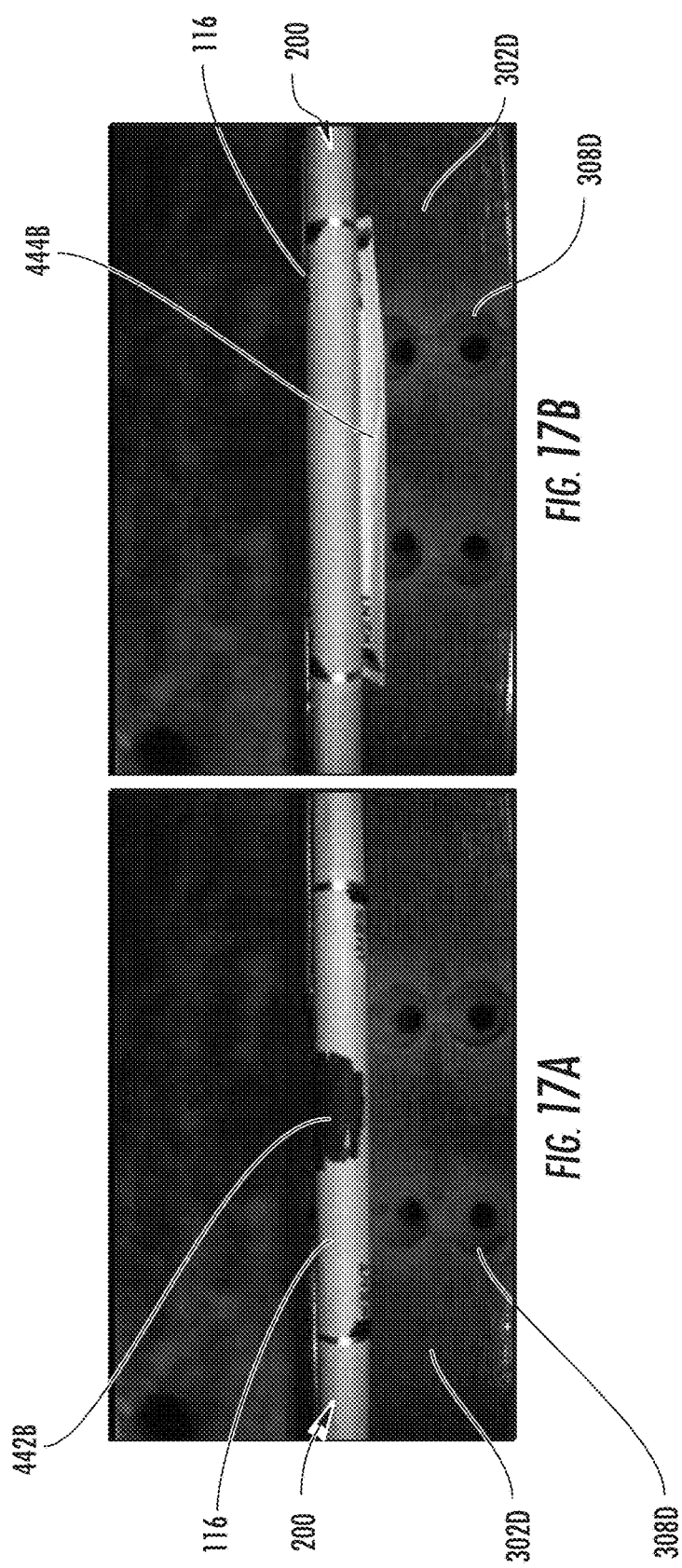

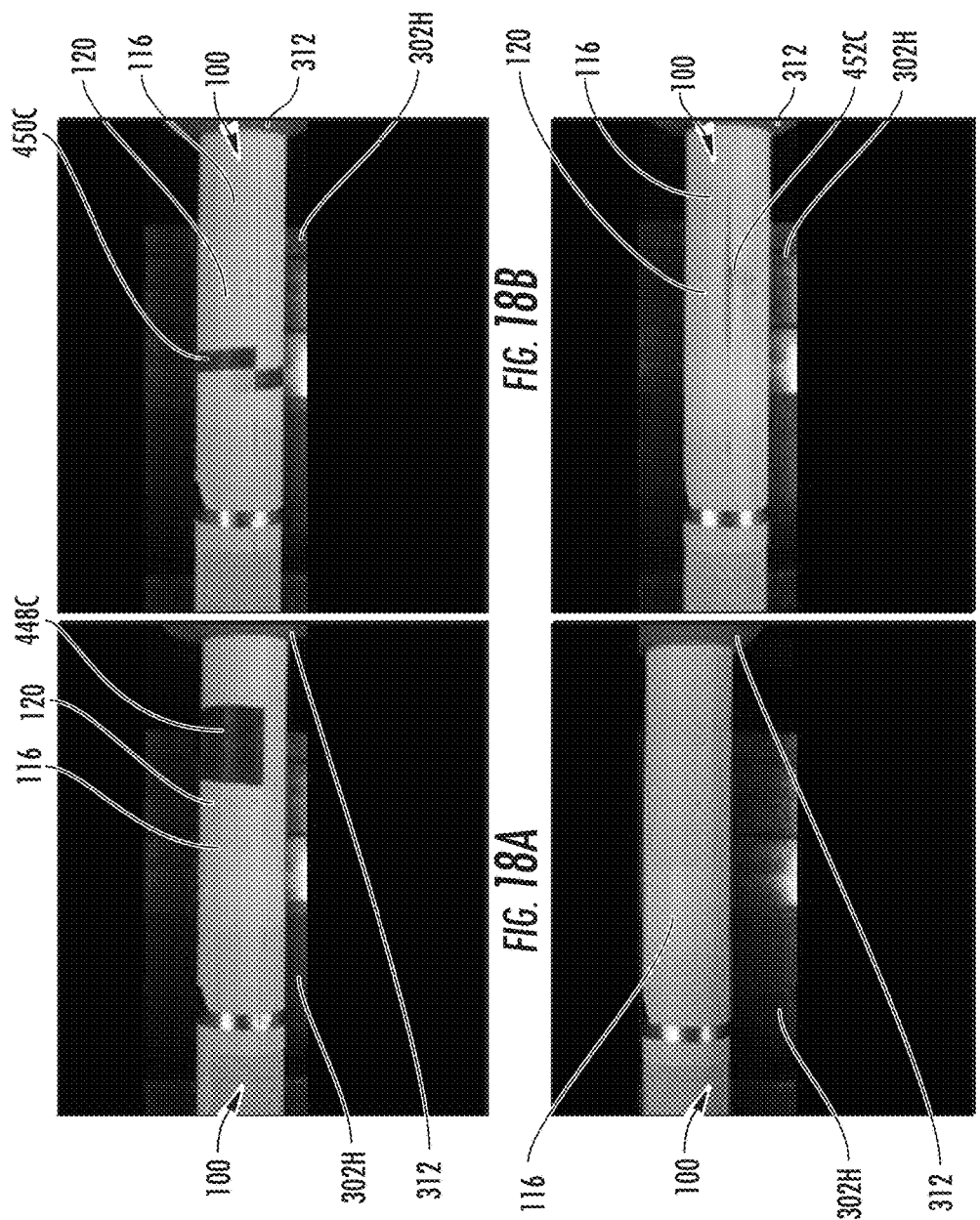

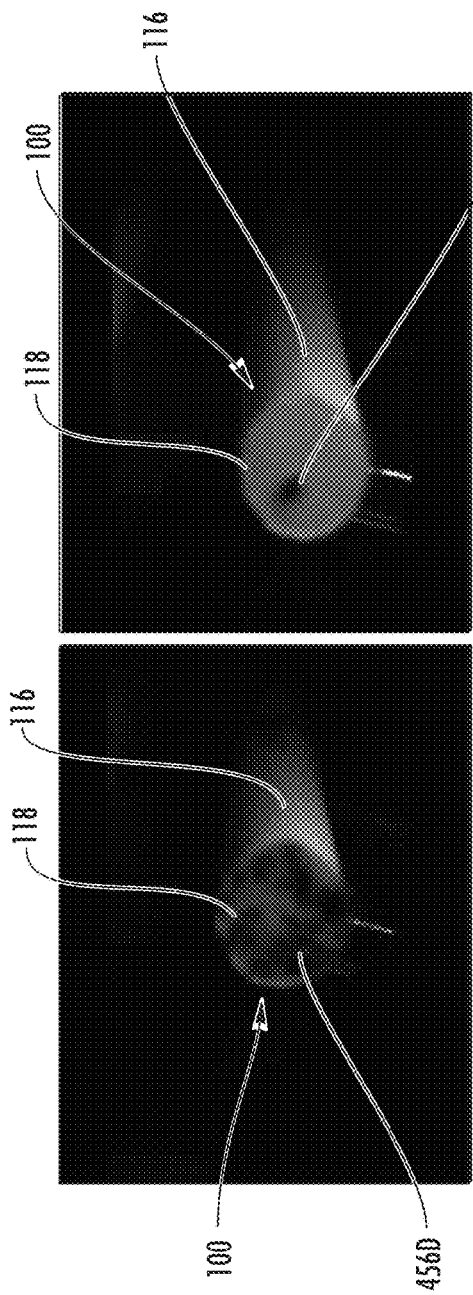
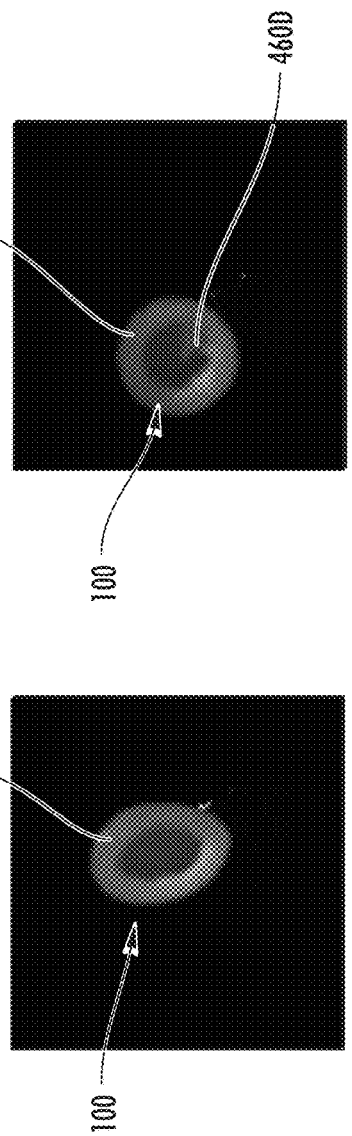
FIG. 19A
FIG. 19B
FIG. 19C
FIG. 19D

SMOKING ARTICLE INSPECTION SYSTEM AND ASSOCIATED METHOD

FIELD OF THE DISCLOSURE

The present disclosure relates to smoking articles and more particularly to smoking article inspection systems and related methods. The smoking articles may be made or derived from tobacco, or otherwise incorporate tobacco, and may be intended for human consumption.

BACKGROUND OF THE DISCLOSURE

Popular smoking articles, such as cigarettes, typically have a substantially cylindrical rod shaped structure and include a charge, roll, or column of smokable material such as shredded tobacco (e.g., in cut filler form) surrounded by a paper wrapper thereby forming a so-called "smokable rod" or "tobacco rod." Normally, a cigarette has a cylindrical filter element aligned in an end-to-end relationship with the tobacco rod. Typically, a filter element comprises cellulose acetate tow plasticized using a plasticizer such as triacetin, and the tow is circumscribed by a paper material known as "plug wrap."

The filter element may be attached to one end of the tobacco rod using a circumscribing wrapping material known as "tipping material" or "tipping paper," in order to provide a so-called "filtered cigarette." More particularly, the tipping material, which may be air impermeable, may circumscribe at least a portion of both the filter element and the tobacco rod to secure the filter element to the tobacco rod. The inner surface of the tipping material may be fixedly secured to the outer surface of the plug wrap circumscribing the filter tow and the outer surface of the wrapping material/paper wrapper surrounding the smokable material of the tobacco rod, using a suitable adhesive. Accordingly, the filter element and the tobacco rod may be connected to one another. The adhesive may also function to secure the overlapping ends of the tipping material circumscribing the filter element and tobacco rod. The tipping material and plug wrap may be perforated in order to provide dilution of drawn mainstream smoke with ambient air.

The above described steps may be performed largely, or entirely, by high-speed automated machinery. During automated production of cigarettes, certain defects may occur. It follows that, due to the high speed nature of the cigarette manufacturing process, many of the defects that may occur may not be readily apparent or otherwise detected before the completed smoking article is packaged for sale. As such, defects may not be discovered until an end user opens the package of smoking articles. Such a situation is generally undesirable to the perception of the quality of the product. As such, there exists a need for an apparatus and method for inspecting smoking articles, such as filtered cigarettes, for defects prior to the products being packaged for distribution and sale. It may also be desirable for such a solution to be readily implemented with respect to existing cigarette production machinery.

SUMMARY OF THE DISCLOSURE

The above and other needs are met by aspects of the present disclosure which, in one aspect, provides a smoking article inspection system configured to inspect a smoking article comprising a smokable rod and a filter element connected by a tipping material. The smoking article inspection system may comprise one or more imaging devices configured to respectively capture one or more images of an exterior of the smoking article and an analysis unit configured to analyze the images captured by the one or more imaging devices. The analysis unit may be configured to execute an edge detection tool configured to determine a position of the smoking article based on an edge location of the smoking article and a defect detection tool configured to determine whether the smoking article is defective after the position of the smoking article is determined.

In some embodiments the edge detection tool may be further configured to determine a second edge location of the smoking article to determine a plurality of boundaries of the smoking article. Further, the defect detection tool may be configured to perform at least one of determining an edge location of the tipping material, detecting a plurality of perforations extending through the tipping material, detecting a contrast between a dark portion and a light portion of the smoking article, determining a color of the smoking article, detecting a pattern, and identifying segments of the filter element. The one or more imaging devices may include at least one of an imaging device configured to capture the one or more images of a longitudinal length of a two-up filtered smoking article assembly during application of the tipping material thereto, an imaging device configured to capture the one or more images of the longitudinal length of the two-up filtered smoking article assembly after creation of a plurality of perforations extending through the tipping material, an imaging device configured to capture the one or more images of the longitudinal length of the smoking article after division of the two-up filtered smoking article assembly, and an imaging device configured to capture the one or more images of a terminus of the smoking article. The smoking article inspection system may additionally include a cleaning device configured to direct a flow of air proximate at least one of the one or more imaging devices to prevent collection of debris thereon.

In an additional aspect a smoking article inspection system configured to inspect a smoking article comprising a smokable rod and a filter element connected by a tipping material is provided. The smoking article inspection system may include a plurality of imaging devices configured to respectively capture one or more images of an exterior of the smoking article. The imaging devices may be configured to capture the images of the smoking article during assembly of the smoking article, wherein assembly of the smoking article comprises a plurality of operations. The smoking article inspection system may additionally include an analysis unit configured to analyze the images captured by the imaging devices. The analysis unit may be configured to execute a defect detection tool configured to determine whether the smoking article is defective from the images thereof, and, if the smoking article is determined to be defective, to determine the one of the operations causing damage to the smoking article from analysis of the images of the smoking article captured during assembly.

In some embodiments the analysis unit may be further configured to execute an edge detection tool configured to determine a position of the smoking article based on an edge location of the smoking article. The defect detection tool may be configured to determine whether the smoking article is defective after the position of the smoking article is determined. The edge detection tool may be further configured to determine a second edge location of the smoking article. The defect detection tool may be configured to perform at least one of determining an edge location of the tipping material, detecting a plurality of perforations extending through the tipping material, detecting a contrast between a dark portion and a light portion of the smoking article, determining a color of the smoking article, detecting a pattern, and identifying segments of the filter element. The imaging devices may include at least one of an imaging device configured to capture the one or more images of a longitudinal length of a two-up filtered smoking article assembly during application of the tipping material thereto, an imaging device configured to capture the one or more images of the longitudinal length of the two-up filtered smoking article assembly after creation of a plurality of perforations extending through the tipping material, an imaging device configured to capture the one or more images of the longitudinal length of the smoking article after division of the two-up filtered smoking article assembly, and an imaging device configured to capture the one or more images of a terminus of the smoking article. The smoking article inspection system may additionally include a cleaning device configured to direct a flow of air proximate at least one of the imaging devices to prevent collection of debris thereon.

In an additional aspect, a method is provided for inspecting a smoking article comprising a smokable rod and a filter element connected by a tipping material. The method may include capturing one or more images of an exterior of the smoking article, determining a position of the smoking article based on an edge location of the smoking article, and determining whether the smoking article is defective after the position of the smoking article is determined.

In some embodiments the method may additionally include determining a second edge location of the smoking article to determine a plurality of boundaries of the smoking article. Further, determining whether the smoking article is defective may include at least one of determining an edge location of the tipping material, detecting a plurality of perforations extending through the tipping material, detecting a contrast between a dark portion and a light portion of the smoking article, determining a color of the smoking article, detecting a pattern, and identifying segments of the filter element. Capturing the one or more images of the exterior of the smoking article may include at least one of capturing the one or more images of a longitudinal length of a two-up filtered smoking article assembly during application of the tipping material thereto, capturing the one or more images of the longitudinal length of the two-up filtered smoking article assembly after creation of a plurality of perforations extending through the tipping material, capturing the one or more images of the longitudinal length of the smoking article after division of the two-up filtered smoking article assembly, and capturing the one or more images of a terminus of the smoking article. The method may additionally include directing a flow of air proximate one or more imaging devices configured to capture the one or more images to prevent collection of debris thereon.

In an additional aspect, a method is provided for inspecting a smoking article comprising a smokable rod and a filter element connected by a tipping material. The method may include capturing a plurality of images of an exterior of the smoking article during assembly of the smoking article, wherein assembly of the smoking article comprises a plurality of operations. Further, the method may include determining whether the smoking article is defective from the images thereof. If the smoking article is determined to be defective, the method may additionally include determining the one of the operations causing damage to the smoking article from analysis of the images of the smoking article captured during assembly.

In some embodiments the method may additionally include determining a position of the smoking article based on an edge location of the smoking article before determining whether the smoking article is defective. Further, the method may include determining a second edge location of the smoking article to determine a plurality of boundaries of the smoking article. Determining whether the smoking article is defective may include at least one of determining an edge location of the tipping material, detecting a plurality of perforations extending through the tipping material, detecting a contrast between a dark portion and a light portion of the smoking article, determining a color of the smoking article, detecting a pattern, and identifying segments of the filter element. Capturing the one or more images of the exterior of the smoking article may include at least one of capturing the one or more images of a longitudinal length of a two-up filtered smoking article assembly during application of the tipping material thereto, capturing the one or more images of the longitudinal length of the two-up filtered smoking article assembly after creation of a plurality of perforations extending through the tipping material, capturing the one or more images of the longitudinal length of the smoking article after division of the two-up filtered smoking article assembly, and capturing the one or more images of a terminus of the smoking article. The method may additionally include directing a flow of air proximate one or more imaging devices configured to capture the one or more images to prevent collection of debris thereon.

Aspects of the present disclosure may also be readily implemented with respect to existing smoking article production machinery. As such, aspects of the present disclosure may be implemented to improve the physical integrity and/or aesthetic qualities of the formed smoking articles. Aspects of the present disclosure thus address the above needs and provide these and other advantages as otherwise detailed herein.

BRIEF DESCRIPTION OF THE DRAWINGS

In order to assist the understanding of aspects of the disclosure, reference will now be made to the appended drawings, which are not necessarily drawn to scale and in which like reference numerals refer to like elements. The drawings are exemplary only, and should not be construed as limiting the disclosure. For the various figures, in order to clearly show the configurations of the various wrapping materials, the thicknesses of those wrapping materials of the various filtered cigarettes may be exaggerated. Most preferably, the wrapping materials are tightly wrapped around the filtered cigarettes to provide a tight or snug fit, to provide a cigarette having acceptable physical integrity, and to provide an aesthetically pleasing appearance.

FIGS. 16A-D are images of defective two-up smoking article assemblies that may be captured by the first imaging device of the smoking article inspection system of FIG. 4;

FIGS. 17A and 17B are images of defective two-up smoking article assemblies that may be captured by the second imaging device of the smoking article inspection system of FIG. 4;

FIGS. 18A-D are images of defective smoking articles that may be captured by the third imaging device of the smoking article inspection system of FIG. 4;

FIGS. 19A-D are images of defective smoking articles that may be captured by the fourth imaging device of the smoking article inspection system of FIG. 4;

DETAILED DESCRIPTION OF THE ASPECTS OF THE DISCLOSURE

The present disclosure now will be described more fully hereinafter with reference to the accompanying drawing. The disclosure may be embodied in many different forms and should not be construed as limited to the aspects set forth herein; rather, these aspects are provided so that this disclosure will satisfy applicable legal requirements.

Figure 1:
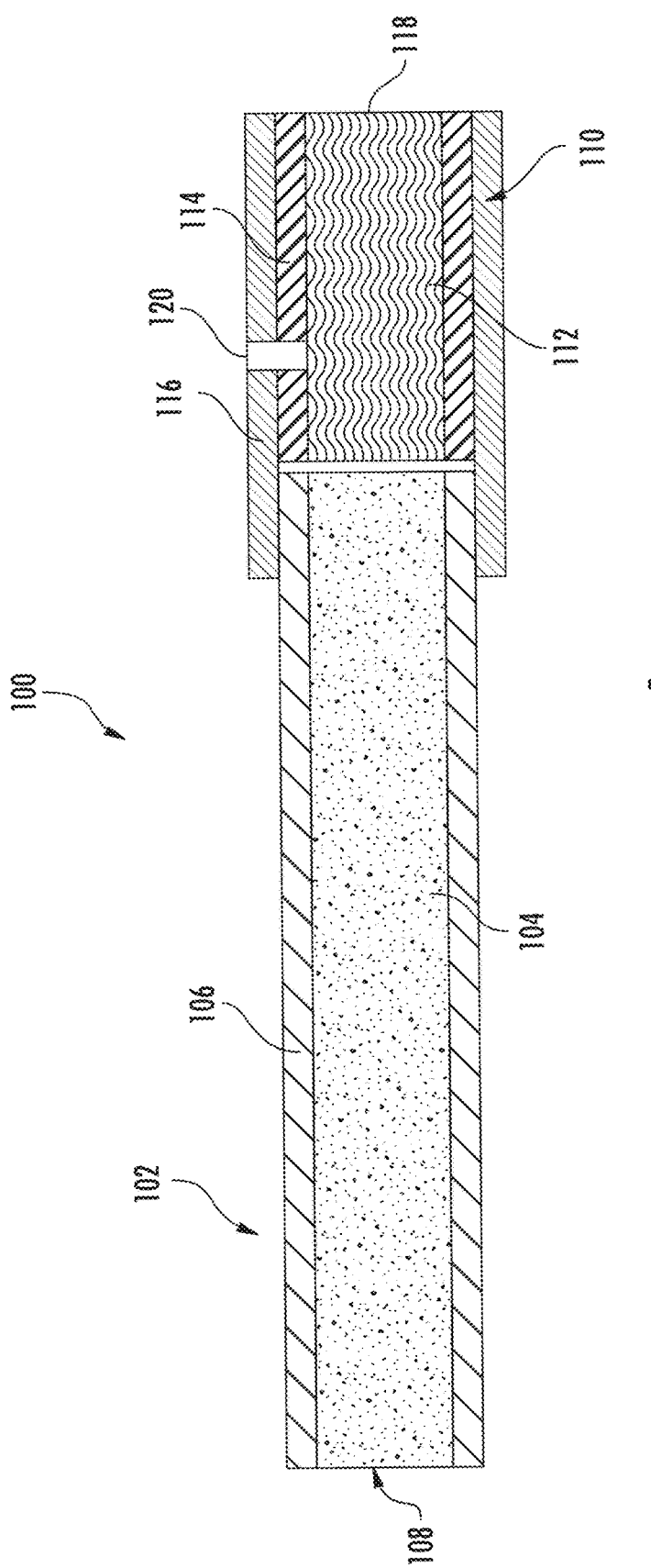
FIG. 1 illustrates a cross-sectional view through a smoking article according to an example embodiment of the present disclosure.

Referring to FIG. 1, there are shown components of a smoking article in the form of a filtered cigarette 100. The cigarette 100 includes a generally cylindrical rod 102 of a charge or roll of smokable filler material 104 contained in a circumscribing wrapping material 106. The rod 102 is conventionally referred to as a "smokable rod" or "tobacco rod." The ends of the tobacco rod are open to expose the smokable filler material. At one end of the tobacco rod 102 is the lighting end 108 (or "lighting end terminus"), and at the other end is shown a filter element 110.

The filter element 110 or other suitable mouthpiece is typically positioned adjacent one end of the tobacco rod 102 such that the filter element and tobacco rod are axially aligned in an end-to-end relationship, preferably abutting one another. The filter element 110 may have a generally cylindrical shape, and the diameter thereof may be essentially equal to the diameter of the tobacco rod 102. The ends of the filter element 110 may be open to permit the passage of air and smoke therethrough. The filter element 110 includes filter material 112 (e.g., plasticized cellulose acetate tow) that is overwrapped along the longitudinally extending surface thereof with by a plug wrap 114. The filter element 110 can comprise two or more filter segments (not shown), and/or flavor additives incorporated therein.

The filter element 110 is attached to the tobacco rod 102 by a tipping material 116 which circumscribes both the entire length of the filter element and an adjacent region of the tobacco rod. Opposite to the tobacco rod 102, the filter element 110 includes a mouth end 118 (or "mouth end terminus"). The inner surface of the tipping material 116 is fixedly secured to the outer surface of the plug wrap 114 and the outer surface of the wrapping material 106 of the tobacco rod, using a suitable adhesive (e.g., a water-based adhesive of the type traditionally employed by cigarette manufacturers for application of tipping paper during filtered cigarette manufacture). That is, the tipping material 116 extends around the longitudinally extending periphery of substantially the entire length of the plug wrap 114, and a portion of the longitudinally extending periphery of the wrapping material 106 of the tobacco rod 102, in a region of the tobacco rod immediately adjacent to the filter element 110. Optionally, the smoking article 110 may be ventilated or air-diluted by air dilution provisions, such as a plurality or series of perforations 120, each of which extends through the tipping material 116 and the plug wrap 114. Adhesive may also be applied to a longitudinally extending seam line or lap zone (not shown) of the tipping material, such as is conventionally employed during cigarette manufacture.

In some instances, the cigarette may also possess one or more additional layers of tipping material (not shown) overlying and circumscribing the inner layer of tipping material. All or selected portions of the inner surface of the additional tipping material can be fixedly secured to the outer surface of the inner tipping material. As such, in some aspects, the additional tipping material may overlie the entire length of the filter element and the adjacent region of the tobacco rod. In one aspect, both tipping materials may extend essentially equal distances along the region of the tobacco rod that is adjacent the filter element. For certain cigarettes, the inner and outer tipping materials may be substantially identical in overall dimension (e.g., those tipping materials have comparable thicknesses, widths, and lengths). In embodiments in which the cigarette is ventilated or air-diluted, air dilution provisions such as a series of perforations may extend through the outer tipping material, the inner tipping material, and the plug wrap. Adhesive can be applied to each of the tipping materials using techniques generally similar to those employed conventionally for tipping material application during cigarette manufacture.

Figure 2:
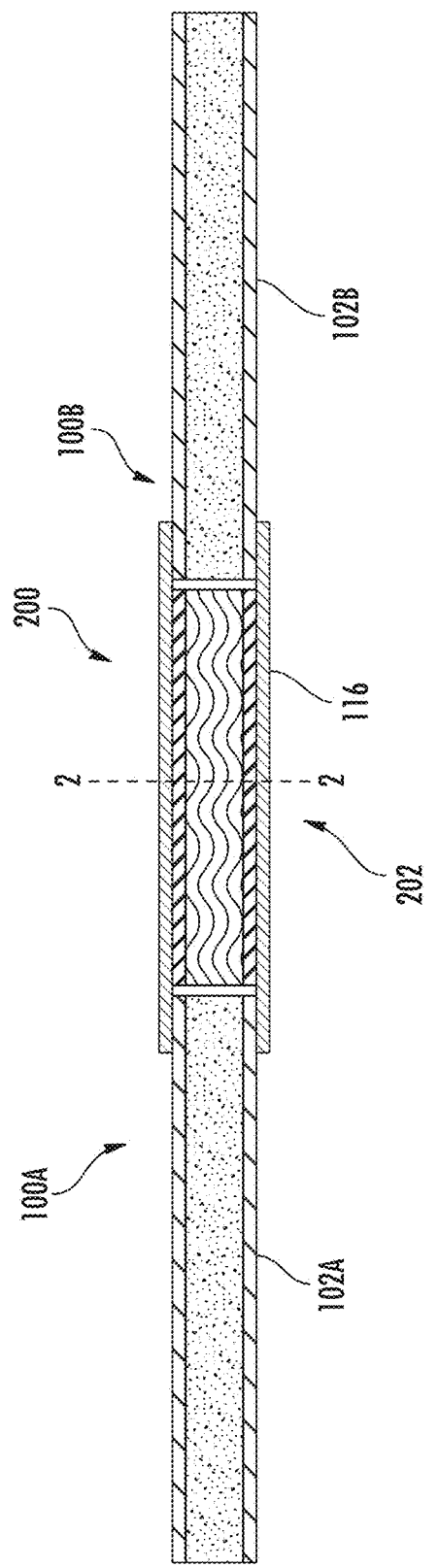
FIG. 2 illustrates a cross-sectional view through a two-up smoking article assembly according to an example embodiment of the present disclosure.

Referring to FIG. 2, there is shown a representative "two-up" filtered smoking article assembly 200 (e.g., a two-up cigarette) that can be subdivided along hashed line 2-2 in order to provide two filtered cigarettes 100A, 100B having a configuration as described with respect to FIG. 1. In addition, representative manners or methods for providing preferred types of cigarettes are described with reference to FIG. 2. A "two-up" filter segment 202 is provided. That representative filter segment 202 possesses filter material circumscribed by plug wrap, as in FIG. 1. Two tobacco rods 102A, 102B are aligned at each end of the "two-up" filter segment 202. A layer of tipping material 116 (e.g., a so-called "patch" of tipping material) is wrapped around the aligned components, such that the tipping material circumscribes the entire length of the "two-up" filter segment 202, and a portion of the length of each tobacco rod 102A, 102B in the respective regions thereof adjacent the filter segment. Typically, that layer of tipping material 116 circumscribes about 3 mm to about 4 mm of the length of each tobacco rod 102A, 102B. As such, the so-called two-up filtered smoking article assembly 200 is provided. For certain preferred aspects, the tipping material 116 may be selected from types of tipping material, and applied in a particular manner, comparable to that traditionally used for commercial filtered cigarette manufacture. Optionally, the cigarette can be air diluted (e.g., using laser perforation techniques) by forming at least one circumscribing ring of perforations through the layer of tipping material 116 and underlying plug wrap. Then, the two-up filtered smoking article assembly 200 is cut in half (i.e., through the "two-up filter segment 202 along hashed line 2-2), perpendicular to its longitudinal axis, to provide two finished cigarettes 100A, 100B. As such, the two finished cigarettes 100A, 100B are each characterized by a smooth mouth end terminus, wherein the mouth end terminus of the filter material, plug wrap, and tipping material are all in the same plane.

Popular smoking articles, such as cigarettes, have a substantially cylindrical rod shaped structure and include a charge, roll, or column of smokable material such as shredded tobacco (e.g., in cut filler form) surrounded by a paper wrapper thereby forming a so-called "smokable rod" or "tobacco rod." Normally, a cigarette has a cylindrical filter element aligned in an end-to-end relationship with the tobacco rod. Typically, a filter element comprises cellulose acetate tow plasticized using a plasticizer such as triacetin, and the tow is circumscribed by a paper material known as "plug wrap."

The filter material can vary, and can be any material of the type that can be employed for providing a tobacco smoke filter for cigarettes. Preferably a traditional cigarette filter material is used, such as cellulose acetate tow, gathered cellulose acetate web, polypropylene tow, gathered cellulose acetate web, gathered paper, strands of reconstituted tobacco, or the like. Especially preferred is filamentary tow such as cellulose acetate, polyolefins such as polypropylene, or the like. One filter material that can provide a suitable filter rod is cellulose acetate tow having 3 denier per filament and 40,000 total denier. As another example, cellulose acetate tow having 3 denier per filament and 35,000 total denier can provide a suitable filter rod. As another example, cellulose acetate tow having 8 denier per filament and 40,000 total denier can provide a suitable filter rod. For further examples, see the types of filter materials set forth in U.S. Pat. No. 3,424,172 to Neurath; U.S. Pat. No. 4,811,745 to Cohen et al.; U.S. Pat. No. 4,925,602 to Hill et al.; U.S. Pat. No. 5,225,277 to Takegawa et al. and U.S. Pat. No. 5,271,419 to Arzonico et al.; each of which is incorporated herein by reference in its entirety.

Normally a plasticizer such as triacetin is applied to the filamentary tow in traditional amounts using known techniques. Other suitable materials or additives used in connection with the construction of the filter element will be readily apparent to those skilled in the art of cigarette filter design and manufacture. See, for example, U.S. Pat. No. 5,387,285 to Rivers.

In some embodiments, filter rods, and the filter elements formed therefrom, may incorporate one or more objects therein. Representative types of filter elements incorporating objects, and representative types of cigarettes possessing filter elements incorporating objects, such as flavor-containing capsules or pellets, can possess the types of components, format and configuration, and can be manufactured using the types of techniques and equipment set forth in U.S. Pat. No. 4,862,905 to Green, Jr. et al.; U.S. Pat. No. 7,115,085 to Deal; U.S. Pat. No. 7,479,098 to Thomas et al.; U.S. Pat. No. 7,740,019 to Nelson et al.; and U.S. Pat. No. 7,972,254 to Stokes et al. and U.S. Patent Application Publication No. 2012/0037546 to Dixon et al., which are incorporated herein by reference in their entireties. See also U.S. Patent Application Publication Nos. 2011/0162662 to Nikolov et al.; 2011/0162665 to Burov et al.; 2012/0077658 to Nikolov et al.; 2012/0245006 to Henley et al.; and 2012/0245007 to Henley et al., which are incorporated herein by reference in their entireties.

Cigarette filter rods can be used to provide multi-segment filter rods. Such multi-segment filter rods can be employed for the production of filtered cigarettes possessing multi-segment filter elements. An example of a two-segment filter element is a filter element possessing a first cylindrical segment incorporating activated charcoal particles (e.g., a "dalmatian" type of filter segment) at one end, and a second cylindrical segment that is produced from a filter rod, with or without objects inserted therein. The production of multi-segment filter rods can be carried out using the types of rod-forming units that have been employed to provide multi-segment cigarette filter components. Multi-segment cigarette filter rods can be manufactured, for example, using a cigarette filter rod making device available under the brand name Mufti from Hauni-Werke Korber & Co. KG of Hamburg, Germany. Representative types of filter designs and components, including representative types of segmented cigarette filters, are set forth in U.S. Pat. No. 4,920,990 to Lawrence et al.; U.S. Pat. No. 5,012,829 to Thesing et al.; U.S. Pat. No. 5,025,814 to Raker; U.S. Pat. No. 5,074,320 to Jones et al.; U.S. Pat. No. 5,105,838 to White et al.; U.S. Pat. No. 5,271,419 to Arzonico et al.; U.S. Pat. No. 5,360,023 to Blakley et al.; U.S. Pat. No. 5,396,909 to Gentry et al.; U.S. Pat. No. 5,718,250 to Banerjee et al.; U.S. Pat. No. 6,761,174 to Jupe et al.; and U.S. Pat. No. 7,240,678 to Crooks et al.; U.S. Patent Application Publication Nos. 2004/0261807 to Dube et al. and 2007/0056600 to Coleman III, et al.; PCT Publication No. WO 03/009711 to Kim; and PCT Publication No. WO 03/047836 to Xue et al.; which are incorporated herein by reference.

The plug wrap can vary. See, for example, U.S. Pat. No. 4,174,719 to Martin. Typically, the plug wrap is a porous or non-porous paper material. Suitable plug wrap materials are commercially available. Exemplary plug wrap papers ranging in porosity from about 1,100 CORESTA units to about 26,000 CORESTA units are available from Schweitzer-Maudit International as Porowrap 17-M1, 33-M1, 45-M1, 70-M9, 95-M9, 150-M4, 150-M9, 240M9S, 260-M4 and 260-M4T; and from Miquel-y-Costas as 22HP90 and 22HP150. Non-porous plug wrap materials typically exhibit porosities of less than about 40 CORESTA units, and often less than about 20 CORESTA units. Exemplary non-porous plug wrap papers are available from Olsany Facility (OP Paprina) of the Czech Republic as PW646; Wattenspapier of Austria as FY/33060; Miquel-y-Costas of Spain as 646; and Schweitzer-Mauduit International as MR650 and 180. Plug wrap paper can be coated, particularly on the surface that faces the filter material, with a layer of a film-forming material. Such a coating can be provided using a suitable polymeric film-forming agent (e.g., ethylcellulose, ethylcellulose mixed with calcium carbonate, nitrocellulose, nitrocellulose mixed with calcium carbonate, or a so-called lip release coating composition of the type commonly employed for cigarette manufacture). Alternatively, a plastic film (e.g., a polypropylene film) can be used as a plug wrap material. For example, non-porous polypropylene materials that are available as ZNA-20 and ZNA-25 from Treofan Germany GmbH & Co. KG can be employed as plug wrap materials.

Filter rods can be manufactured using a rod-making apparatus, and an exemplary rod-making apparatus includes a rod-forming unit. Representative rod-forming units are available as KDF-2, KDF-2E, KDF-3, and KDF-3E from Hauni-Werke Korber & Co. KG; and as Polaris-ITM Filter Maker from International Tobacco Machinery. Filter material, such as cellulose acetate filamentary tow, typically is processed using a conventional filter tow processing unit. For example, filter tow can be bloomed using bussel jet methodologies or threaded roll methodologies. An exemplary tow processing unit has been commercially available as E-60 supplied by Arjay Equipment Corp. of Winston-Salem, N.C. Other exemplary tow processing units have been commercially available as AF-2, AF-3 and AF-4 from Hauni-Werke Korber & Co. KG and as Candor-ITM Tow Processor from International Tobacco Machinery. Other types of commercially available tow processing equipment, as are known to those of ordinary skill in the art, can be employed. Other types of filter materials, such as gathered paper, nonwoven polypropylene web or gathered strands of shredded web, can be provided using the types of materials, equipment and techniques set forth in U.S. Pat. No. 4,807,809 to Pryor et al. and U.S. Pat. No. 5,025,814 to Raker. In addition, representative manners and methods for operating a filter material supply units and filter-making units are set forth in U.S. Pat. No. 4,281,671 to Bynre; U.S. Pat. No. 4,850,301 to Green, Jr. et al.; U.S. Pat. No. 4,862,905 to Green, Jr. et al.; U.S. Pat. No. 5,060,664 to Siems et al.; U.S. Pat. No. 5,387,285 to Rivers and U.S. Pat. No. 7,074,170 to Lanier, Jr. et al. Other types of technologies for supplying filter materials to a filter rod-forming unit are set forth in U.S. Pat. No. 4,807,809 to Pryor et al. and U.S. Pat. No. 5,025,814 to Raker; which are incorporated herein by reference.

Cigarette rods are manufactured using a cigarette making machine, such as a conventional automated cigarette rod making machine. Exemplary cigarette rod making machines are of the type commercially available from Molins PLC or Hauni-Werke Korber & Co. KG. For example, cigarette rod making machines of the type known as MIA (commercially available from Molins PLC) or PROTOS (commercially available from Hauni-Werke Korber & Co. KG) can be employed. A description of a PROTOS cigarette making machine is provided in U.S. Pat. No. 4,474,190 to Brand, at col. 5, line 48 through col. 8, line 3, which is incorporated herein by reference. Types of equipment suitable for the manufacture of cigarettes also are set forth in U.S. Pat. No. 4,781,203 to La Hue; U.S. Pat. No. 4,844,100 to Holznagel; U.S. Pat. No. 5,156,169 to Holmes et al.; U.S. Pat. No. 5,191,906 to Myracle, Jr. et al.; U.S. Pat. No. 6,647,870 to Blau et al.; U.S. Pat. No. 6,848,449 to Kitao et al.; U.S. Pat. No. 6,904,917 to Kitao et al.; U.S. Pat. No. 7,210,486 to Hartman; U.S. Pat. No. 7,234,471 to Fitzgerald et al.; U.S. Pat. No. 7,275,548 to Hancock et al.; and U.S. Pat. No. 7,281,540 to Barnes et al.; each of which is incorporated herein by reference.

The components and operation of conventional automated cigarette making machines will be readily apparent to those skilled in the art of cigarette making machinery design and operation. For example, descriptions of the components and operation of several types of chimneys, tobacco filler supply equipment, suction conveyor systems and garniture systems are set forth in U.S. Pat. No. 3,288,147 to Molins et al.; U.S. Pat. No. 3,915,176 to Heitmann et al; U.S. Pat. No. 4,291,713 to Frank; U.S. Pat. No. 4,574,816 to Rudszinat; U.S. Pat. No. 4,736,754 to Heitmann et al. U.S. Pat. No. 4,878,506 to Pinck et al.; U.S. Pat. No. 5,060,665 to Heitmann; U.S. Pat. No. 5,012,823 to Keritsis et al. and U.S. Pat. No. 6,360,751 to Fagg et al.; and U.S. Patent Application Publication No. 2003/0136419 to Muller; each of which is incorporated herein by reference. The automated cigarette making machines of the type set forth herein provide a formed continuous cigarette rod or smokable rod that can be subdivided into formed smokable rods of desired lengths.

A cigarette is employed by a smoker by lighting the lighting end terminus thereof opposite the filter element and burning the tobacco rod. The smoker then receives mainstream smoke into his/her mouth by drawing on the opposite end (e.g., the filter element or mouth end terminus) of the cigarette. Accordingly, drawn mainstream smoke may be diluted with ambient air by the perforations and/or off-line air dilution techniques described above. For cigarettes that are air diluted or ventilated, the amount or degree of air dilution or ventilation can vary. Frequently, the amount of air dilution for an air diluted cigarette is greater than about 10 percent, generally is greater than about 20 percent, often is greater than about 30 percent, and sometimes is greater than about 40 percent. Typically, the upper level for air dilution for an air diluted cigarette is less than about 80 percent, and often is less than about 70 percent. As used herein, the term "air dilution" is the ratio (expressed as a percentage) of the volume of air drawn through the air dilution provisions to the total volume and air and smoke drawn through the cigarette and exiting the extreme mouth end portion of the cigarette.

The dimensions of a representative filtered cigarette can vary. Preferred cigarettes are rod-shaped, and can have diameters of about 7.5 mm (e.g., circumferences of about 20 mm to about 27 mm, often about 22.5 mm to about 25 mm); and can have total lengths of about 70 mm to about 120 mm, often about 80 mm to about 100 mm. The length of the filter element can vary. Typical filter elements can have total lengths of about 15 mm to about 40 mm, often about 20 mm to about 35 mm. For a typical dual-segment filter element, the downstream or mouth end filter segment often has a length of about 10 mm to about 20 mm; and the upstream or tobacco rod end filter segment often has a length of about 10 mm to about 20 mm.

During the manufacture of filtered smoking articles, such as filtered cigarettes, certain defects may occur. Accordingly, embodiments of the present disclosure are directed to systems and methods for inspecting smoking articles. More particularly, the present disclosure is directed to inspection of smoking articles during the manufacture thereof and tools employed in analyzing images of smoking articles to determine whether the assembled smoking articles are defective and the operation causing such defect.

Figure 3:
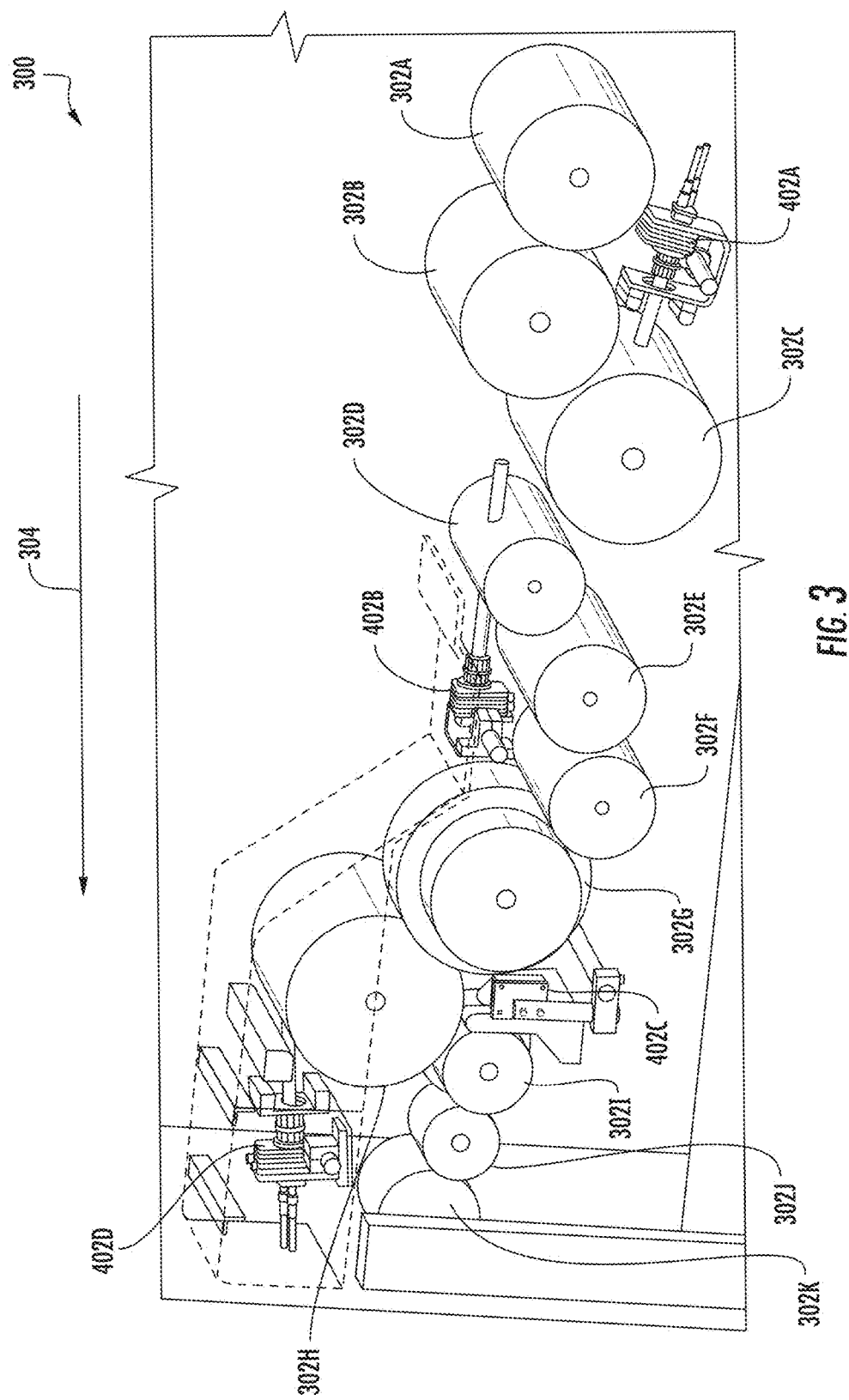
FIG. 3 illustrates a schematic view of a smoking article maker according to an example embodiment of the present disclosure.

In this regard, FIG. 3 schematically illustrates a smoking article or cigarette maker 300. In one embodiment the cigarette maker 300 may comprise a MAX 90 cigarette maker from Hauni-Werke Korber & Co. KG of Hamburg, Germany. The cigarette maker 300 may include a plurality of substantially cylindrical rotatable devices such as cylinders or drums. In the illustrated embodiment, the cigarette maker 300 includes first through eleventh drums 302A-K. The drums 302A-K may be configured to transport smoking articles, in various stages of completion, between various stations performing operations thereon.

The smoking articles may generally progress from drum-to-drum in a direction corresponding to an increasing state of completion as indicated by arrow 304. In this regard, tipping paper may be applied to the smoking article at the third drum 302C, perforations may be cut (e.g., laser cut) in the tipping paper and the plug wrap at the fourth drum 302D, the smoking articles may be divided from a two-up smoking article assembly into two completed smoking articles at the fifth drum 302E, the completed smoking articles may be inspected at the eighth drum 302H, and defective smoking articles may be ejected at the ninth drum 302I. The remaining drums may be configured to transport the smoking articles between the various drums where operations are performed on the smoking articles, reposition the smoking articles, and/or perform other functions. Accordingly, the remaining drums may comprise transfer drums in some embodiments.

The smoking articles may generally be held in contact with the drums, with each smoking article oriented such that a longitudinal axis thereof is parallel to a rotational axis of the drum that the smoking article is in contact therewith. For example, the smoking articles may be held in channels or flutes in the drums via gravity, via suction applied thereto, and/or via contact therewith by one or more mechanical mechanisms. Gravity or other means and mechanisms may be employed to transfer the smoking articles between the drums.

It may be desirable to inspect the smoking articles prior to packaging and transport of the smoking articles for sale. Accordingly, the cigarette maker 300 may include an inspection system in some embodiments. In this regard, as noted above, the smoking articles may be inspected at the eighth drum 302H in some embodiments. As further noted above, the smoking articles may be completed by the time they reach the eight drum 302H. Accordingly, the completed smoking articles may be inspected prior to packaging and transport to consumers.

Figure 4:
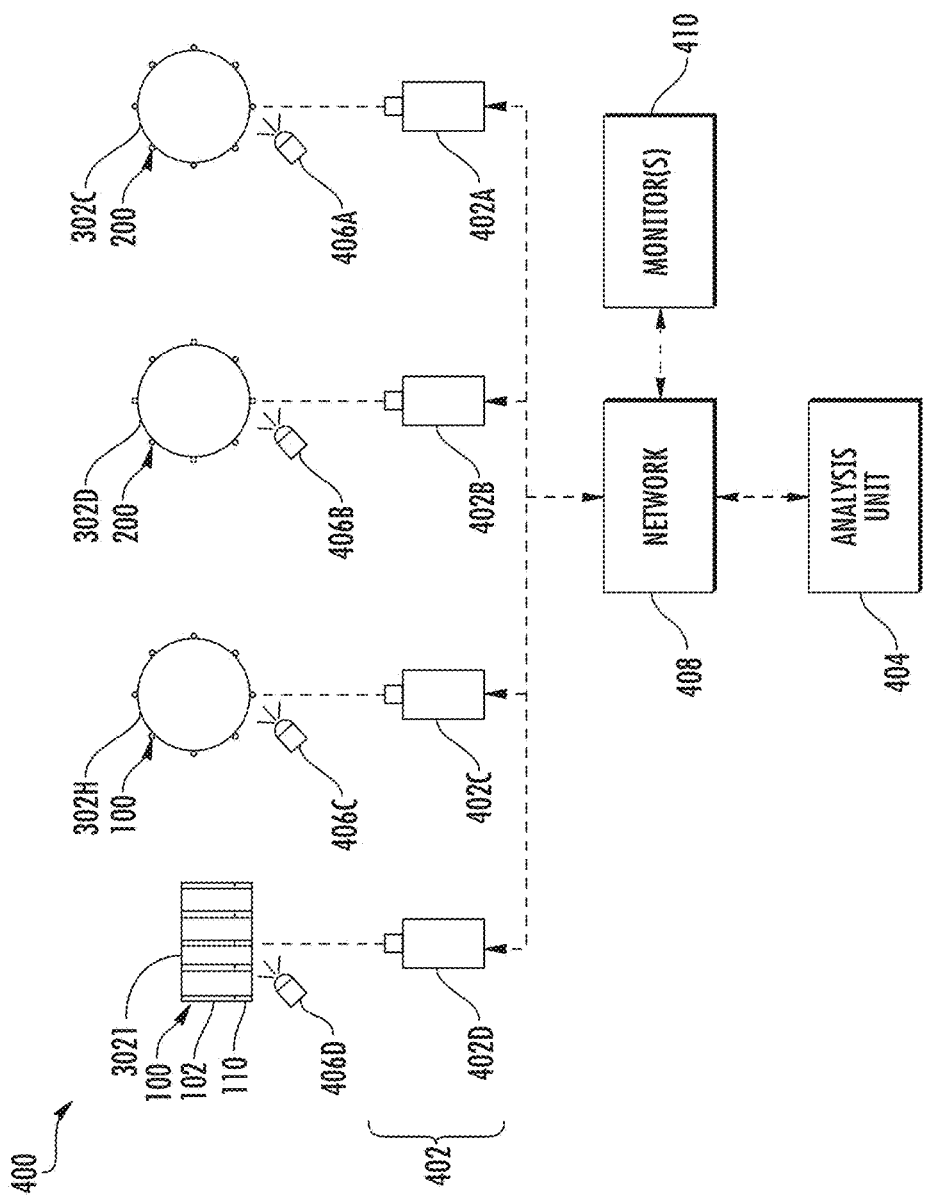
FIG. 4 illustrates a schematic view of a smoking article inspection system according to an example embodiment of the present disclosure.

However, Applicant has determined that it may be desirable to inspect the smoking articles at additional or alternative stages during the manufacture thereof. In this regard, FIG. 4 schematically illustrates a smoking article inspection system 400 configured to inspect a smoking article. As described above, the smoking article may comprise a smokable rod 102 and a filter element 110 connected by a tipping material 112 (see, e.g., FIG. 1). The inspected smoking articles may be inspected in various states of completion. In this regard, the smoking articles may comprise two-up smoking article assemblies 200 in some embodiments (see, e.g., FIG. 2), individual, completed, as-formed smoking articles 100 (see, e.g., FIG. 1), or components thereof in any state of completion.

The smoking article inspection system 400 may comprise an inspection apparatus 402. Further, the smoking article inspection system 400 may include an analysis unit 404. Accordingly, the analysis unit 404 may analyze data captured by the inspection apparatus 402.

In one embodiment the inspection apparatus 402 may comprise one or more infrared cameras, x-ray devices, magnetic resonance imaging (MRI) devices, thermal imaging devices, microphones, and/or visible spectrum imaging devices. In one embodiment, the inspection apparatus 402 comprises a plurality of imaging devices 402A-D configured to respectively capture one or more images of an exterior of the smoking article (e.g., cameras configured to capture images in the visible light spectrum). As discussed hereinafter, the images may be captured of a longitudinal periphery of each smoking article or the longitudinal ends thereof. Accordingly, the analysis unit 404 may be configured to analyze the images captured by the one or more imaging devices 402A-D. Further, in some embodiments one or more of the imaging devices 402A-D may include an illumination source 406A-D associated therewith, which may illuminate the exterior of the smoking articles in order to facilitate capturing images thereof.

In some embodiments the imaging devices 402A-D may be configured to capture images in color. Further, the imaging devices 402A-D may comprise high-speed cameras in some embodiments. For example, the imaging devices 402A-D may be configured to capture at least about thirty frames per second in one embodiment, at least about fifty frames per second in an additional embodiment, and at least about sixty frames per second in a preferred embodiment. Accordingly, the imaging devices 402A-D may be configured to capture images of the smoking articles while the smoking articles move at relatively high speeds during the production thereof.

In one embodiment the imaging devices 402A-D may comprise the In-Sight 7000 Series Vision System, from Cognex Corp. of Natick, Mass. In this embodiment the imaging devices 402A-D may include integral illumination sources. Accordingly, the separate illumination sources 406A-D may be omitted in some embodiments.

As noted above, Applicant has determined that it may be desirable to inspect the smoking articles at various stages of completion. By inspecting the smoking articles during assembly thereof, it may be possible to determine which operations in the assembly process are causing defects. Thereby, repairs and/or adjustments may be made to the particular operations causing the defects. In another embodiment it may be possible to remove defective smoking articles prior to completion thereof to save resources or reduce the risk of the defective smoking article continuing in the production process. For example, after a partially-completed smoking article is determined to be defective, the smoking article may be removed prior to completion thereof. In this regard, the determination of whether a smoking article is defective may be made during the production thereof (e.g., prior to completion) in one embodiment. By way of further example, defective smoking article removal devices (e.g., ejectors) may additionally or alternatively be positioned downstream of the first imaging device 402A and/or the second imaging device 402B in some embodiments. Thereby, by removing the defective, partially-completed smoking articles, material savings may occur by avoiding the unnecessary addition of materials thereto and/ or unnecessary wear to the cigarette maker 300 may be avoided by preventing usage of wear items such as cutting blades thereon. In another embodiment it may be possible to adjust parameters of the assembly operations performed by the cigarette maker 300 and/or it may be possible to identify defective components of the smoking articles (e.g., defective tipping material supplied to the cigarette maker) in order to avoid the defects. Note, however, that in an alternate embodiment the determination of whether a smoking article is defective may be made after the completion of the smoking article, for example, in instances in which the operation of the cigarette maker 300 appears to be stable and proper.

In one embodiment the imaging devices 402A-D may be configured to capture the images of the smoking article during and after assembly of the smoking article. In this regard, in the embodiment in FIG. 4, a first imaging device 402A is configured to capture images of the smoking articles at the third drum 302C, a second imaging device 402B is configured to capture images of the smoking articles at the fourth drum 302D, the third imaging device 402C is configured to capture images of the smoking articles at the eighth drum 302H, and the fourth imaging device 402D is configured to capture images of the smoking articles at the ninth drum 302I. Example positions of the imaging devices 402A-D with respect to the drums 302C, D, H, I are illustrated in FIG. 3.

Various control schemes may be employed to keep track of the smoking articles as they are assembled. In this regard, in one embodiment timing mechanisms may be employed to determine the identity of a smoking article for which an image is captured thereof. For example, the amount of time associated with moving through the cigarette maker 300 from the start to each of the imaging devices 402A-D may be proportional to the rotational speed of the drums 302A-K. Accordingly, the time at which an image of a smoking article is captured may be employed to identify the smoking article. In another embodiment the identity of a smoking article may be determined by maintaining a count of the number of smoking articles having images thereof captured. In some embodiments the count may be based on the number of images captured, regardless of whether a smoking article appears therein, in order to account for removed (e.g., removed as defective) or missing (e.g., fallen from one of the drums 302A-K) smoking articles. In a further embodiment, identification of the smoking articles may be based on the number of rotations of the drums 302A-K and/or the rotational position thereof. In this regard, the number of rotations of the drums 302A-K and the rotational position thereof may directly correspond to the position of the smoking articles in the cigarette maker 300. For example, the drums 302A-K may be rotationally synchronized. However, various other techniques may be employed to identify each of the smoking articles having images captured thereof. Identification of smoking articles using one of the above-mentioned techniques or various other techniques may be important in that removal of defective smoking articles may occur downstream of the locations at which the images of the smoking articles are captured. Thereby, the position of the smoking articles must be known and tracked such that the correct smoking articles, identified as defective, may be removed.

The smoking article inspection system 400 may additionally include a network 408 (e.g., a local network or the internet). The analysis unit 404 may connect to the imaging devices 402A-D through the network 408. In another embodiment the analysis unit 404 may communicate directly with the imaging devices 402A-D. Further, the smoking article inspection system 400 may include one or more monitor(s) 410. The monitors 410 may be configured to display images captured by the imaging devices 402A-D and/or information provided by the analysis unit 404.

Figure 5:
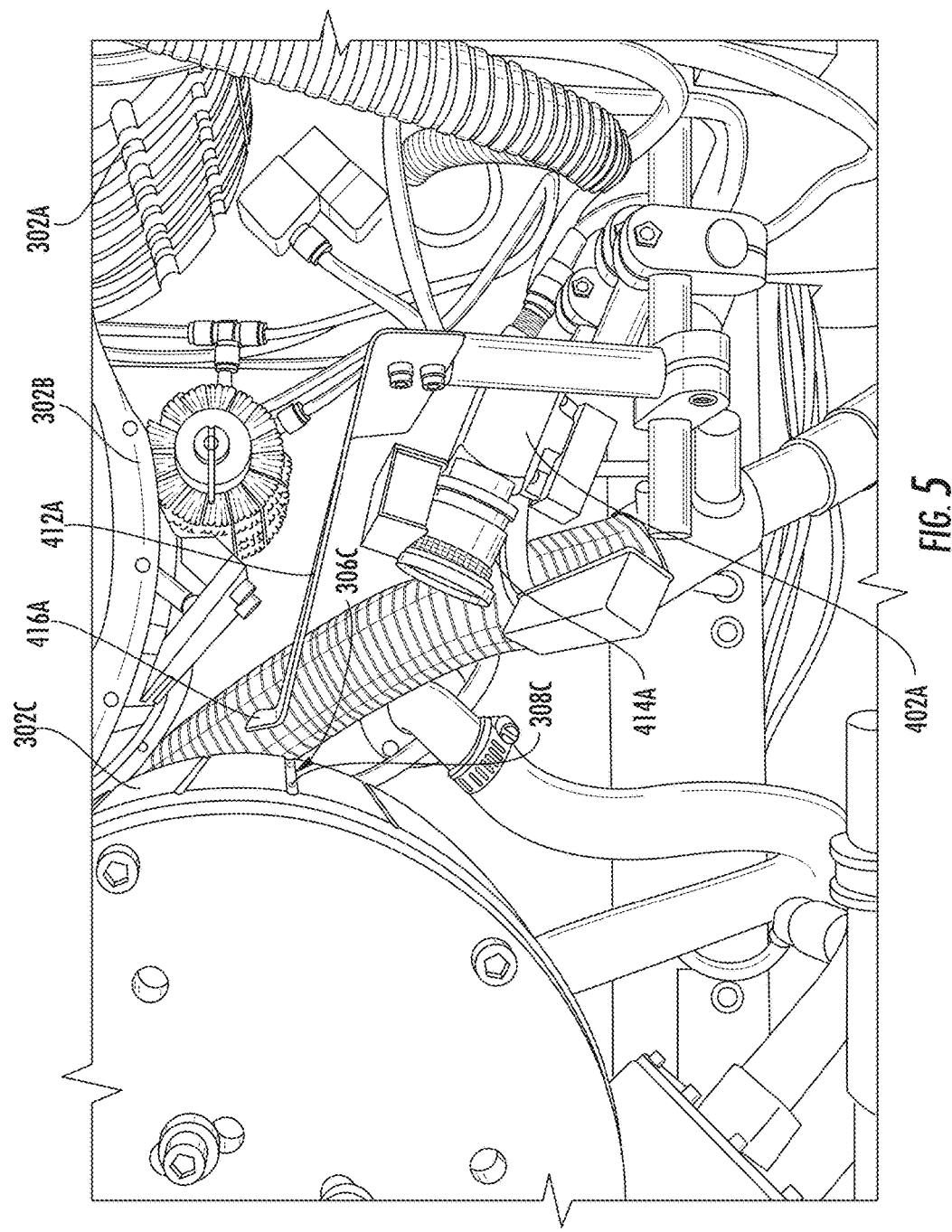
FIG. 5 illustrates an enlarged view of a first imaging device of the smoking article inspection system of FIG. 4 according to an example embodiment of the present disclosure.

FIG. 5 illustrates an enlarged perspective view of the third drum 302C and the first imaging device 402A. Tobacco rods and filter elements may be transferred to the third drum 302C by transfer drums 302A, B. The third drum 302C may comprise a roll drum, at which tipping material is applied to the tobacco rod and the filter rod to form the two-up smoking article assembly 200 (see, e.g., FIG. 2).

The third drum 302C may include a plurality of grooves, slots, or channels 306C at the circumference thereof oriented parallel to the rotational axis of the third drum. Each of the channels 306C may be configured to receive a two-up filtered smoking article assembly 200. In order to retain the two-up filtered smoking article assemblies in the channels 306C, one or more suction ports 308C may be respectively positioned in the channels 306C. Accordingly, suction applied to the suction ports 308C may retain the two-up filtered smoking article assemblies 200 in the channels 306C as the roll drum 302C rotates. Thereby, the tipping material 116 may be applied to form the two-up smoking article assembly 200 (see, e.g., FIG. 2).

As illustrated, the first imaging device 402A may be generally aimed toward the circumference of the third drum 302C. Accordingly, the first imaging device 402A may be positioned, aimed, and focused to capture images of at least a portion of a longitudinal length of a two-up filtered smoking article assembly 200 before, during, or after application of the tipping material thereto. A debris shield 412A may be configured to block debris from a lens 414A of the first imaging device 402A. In this regard, tobacco crumbs, paper particles, dust, and/or other materials may release from the smoking articles during assembly thereof, which could coat the lens 414A and impair the image capturing abilities of the first imaging device 402A. As illustrated, the debris shield 412A may include a lip 416A positioned proximate the outer surface of the third drum 302C and oriented substantially tangentially to a portion thereof. Accordingly, the lip 416A may provide further protection in terms of directing debris away from the lens 414A of the first imaging device 402A which may release from the smoking articles on the third drum 302C substantially tangentially. These and various other techniques configured to prevent build-up of debris on lenses of the imaging devices, which are described hereinafter, may be employed at any of the imaging devices 402A-D.

Figure 6:
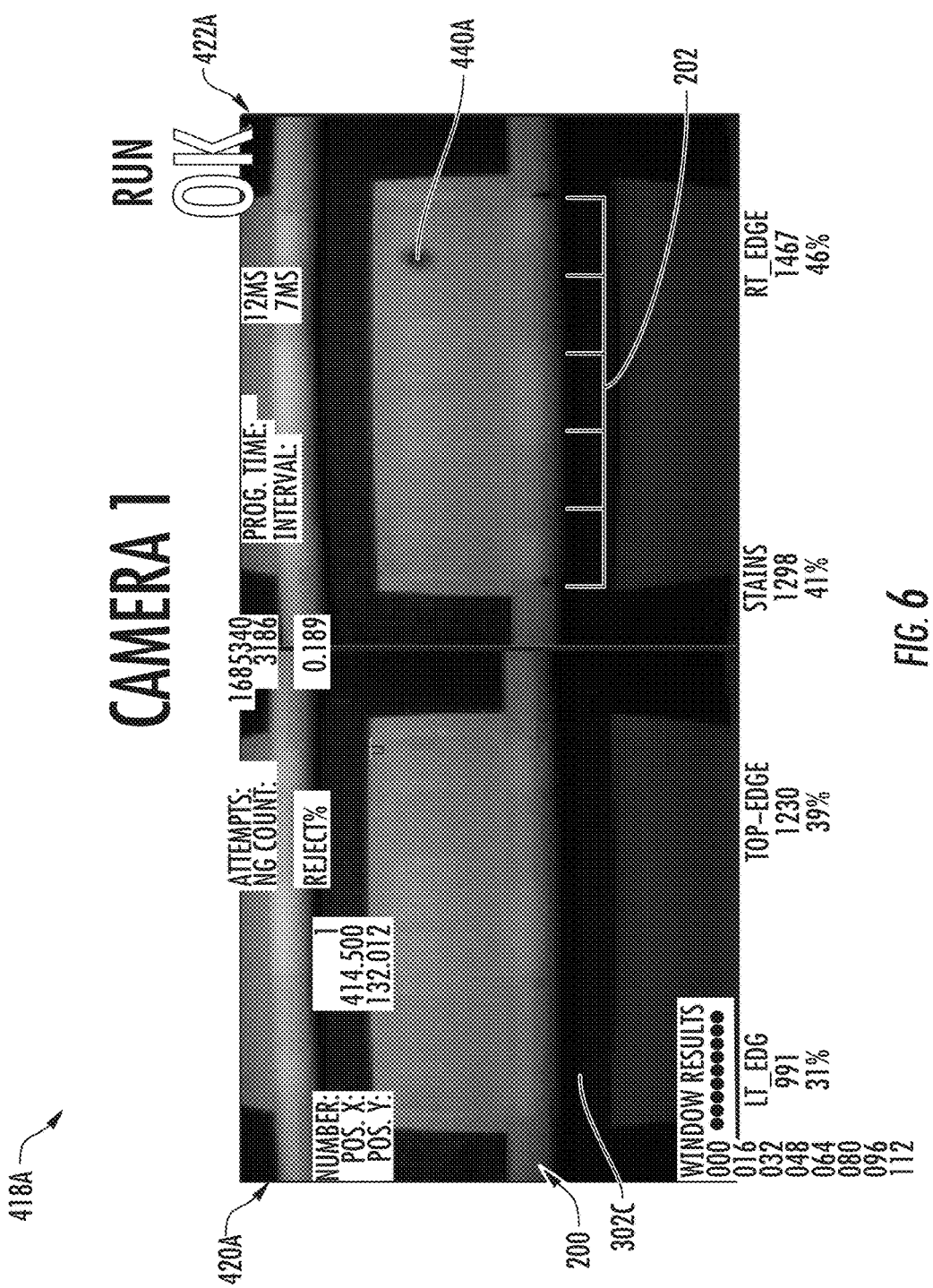
FIG. 6 is a screenshot from a monitor including images captured by the first imaging device according to an example embodiment of the present disclosure.

FIG. 6 illustrates an example screenshot 418A including first and second images 420A, 422A of at least a portion of the longitudinal length of the two-up smoking article assembly 200. The images 420A, 422A may be captured by the first imaging device 402A. The images 420A, 422 may be outputted on a monitor (e.g., monitor 410), which may be connected to one or more of the imaging devices 402A-D and/or the analysis unit 404.

In one embodiment the first image 420A is the most recent image captured by the first imaging device 402A. Accordingly, an operator of the cigarette maker 300 may be apprised of the current status of the two-up filtered smoking article assemblies 200 at the third drum 302C. For example, as illustrated, the images may show the tipping material immediately following attachment to the two-up smoking article assembly and prior to completed wrapping thereabout. The second image 422A, which may be displayed simultaneously with the first image 420A, may be the most recently-detected defective two-up smoking article assembly 200 at the third drum 302C. Accordingly, the operator may also be apprised of detected defects occurring in the two-up filtered smoking article assemblies 200 at the third drum 302C. Techniques and tools employed by the analysis unit 404 for detecting defects using the images 420A, 422A are discussed below.

In some embodiments the first imaging device 402A captures images of a plurality of the two-up smoking article assemblies 200 in each image. For example, in the embodiment illustrated in FIG. 6, the first imaging device 402A captures images of two of the two-up filtered smoking article assemblies 200 in each of the images. Capturing multiples of the two-up smoking article assemblies 200 in each image may provide various advantages.

For example, in some embodiments the rotational speed of the third drum 302C may cause the two-up smoking article assemblies 200 to pass the first imaging device 402A at a rate that exceeds the frame rate of the first imaging device. Accordingly, capturing multiples of the two-up smoking article assemblies 200 in each image may allow for inspection of each of the two-up smoking article assemblies. Thus, capturing images of multiples of the two-up smoking article assemblies 200 may allow for inspection of each of the two-up smoking article assemblies despite frame rate limitations of the first imaging device 402A.

Further, in embodiments in which the frame rate of the first imaging device 402A is sufficient to capture individual images of each of the two-up smoking article assemblies 200 passing thereby, capturing multiple image of the two-up smoking article assemblies may still provide benefits. In this regard, in some embodiments each image may capture at least two of the two-up smoking article assemblies 200 such that at least two images are captured of each two-up smoking article assembly in successive frames. By capturing more than one image of each two-up smoking article assembly 200, the smoking article inspection system 400 may analyze and inspect the multiple images of each two-up smoking article assembly such that each two-up smoking article assembly is inspected multiple times at the third drum 302C. Accordingly, multiple images of each two-up smoking article assembly may be captured without requiring a higher frame rate of the imaging device, which may not be available or which may be cost prohibitive.

Note that the remainder of the disclosure generally describes and illustrates capturing images of individual smoking articles, as opposed to multiple smoking articles in each image. However, multiple smoking articles may be captured in each image at any of the drums. Accordingly, the disclosure is not limited to the example embodiments disclosed herein.

Figure 7:
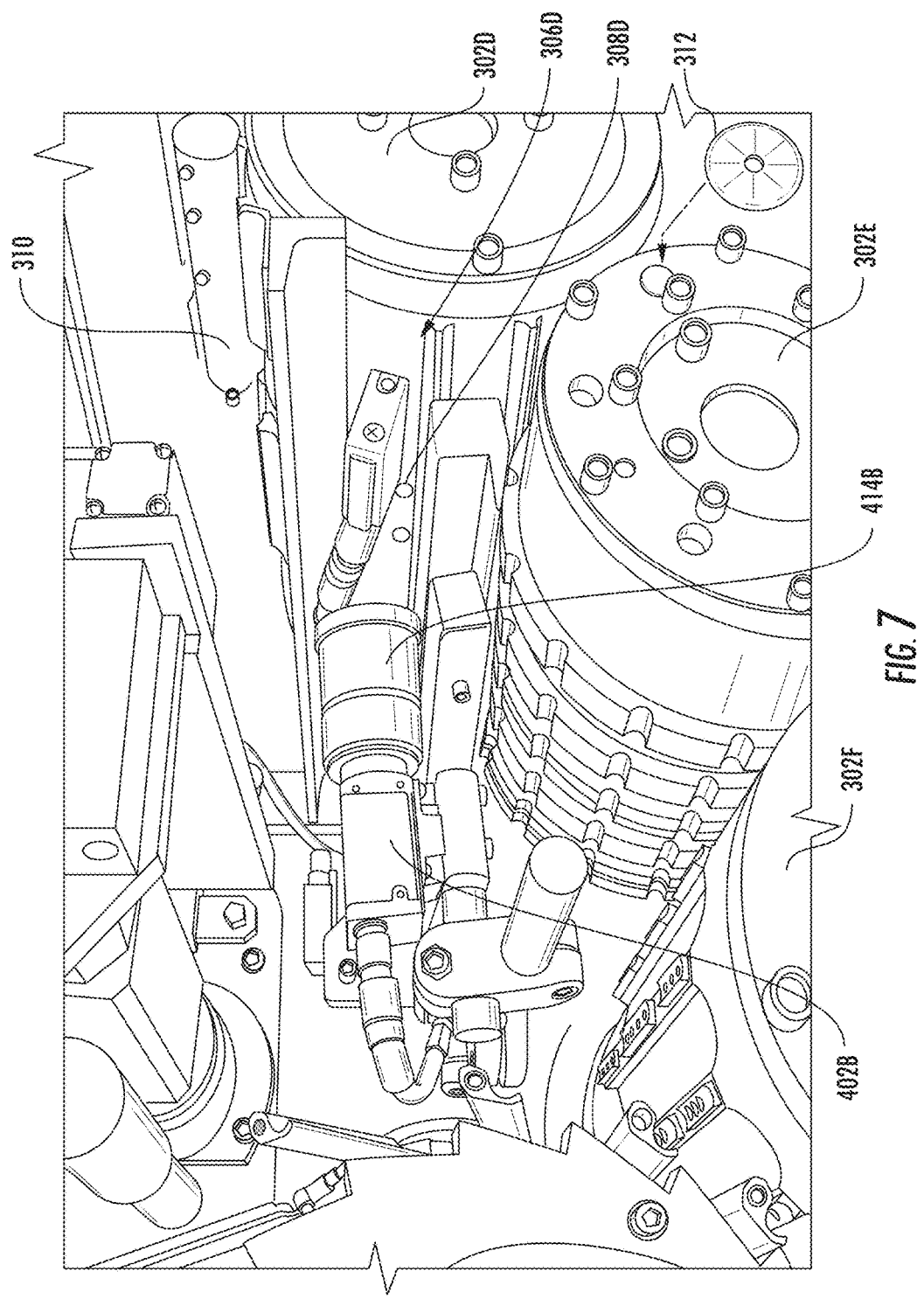
FIG. 7 illustrates an enlarged view of a second imaging device of the smoking article inspection system of FIG. 4 according to an example embodiment of the present disclosure.

FIG. 7 illustrates an enlarged perspective view of the fourth drum 302D and the second imaging device 402B. The fourth drum 302D may include a plurality of grooves, slots, or channels 306D at the circumference thereof oriented parallel to the rotational axis of the fourth drum. The channels 306D may be configured to respectively receive one or more two-up filtered smoking article assemblies 200 from the third drum 302C. In order to retain the two-up filtered smoking article assemblies in the channels 306D, one or more suction ports 308D may be respectively positioned in the channels. Accordingly, suction applied to the suction ports 308D may retain the two-up filtered smoking article assemblies 200 in the channels 306D as the fourth drum 302D rotates.

The fourth drum 302D may comprise a perforation drum, at which the perforations 120 (see, e.g., FIG. 1) are formed in the two-up smoking article assembly 200 (see, e.g., FIG. 2). In this regard, the cigarette maker 300 may include a laser 310. The laser 310 may be configured to direct one or more laser beams at the two-up smoking article assembly 200 to form the perforations 120 therein.

As illustrated, the second imaging device 402B may be generally aimed toward the circumference of the fourth drum 302D. Accordingly, the second imaging device 402B may be positioned, aimed, and focused to capture images of at least a portion of a longitudinal length of a two-up filtered smoking article assembly 200 after the perforations 120 are cut therein. In this regard, as illustrated, a lens 414B of the second imaging device 402B may be directed at a location on the outer surface of the fourth drum 302D downstream of the laser 310. In this regard, the fourth drum 302D and the remaining drums may rotate in a generally counterclockwise direction in terms of the orientation illustrated in FIGS. 3 and 7.

Figure 8:
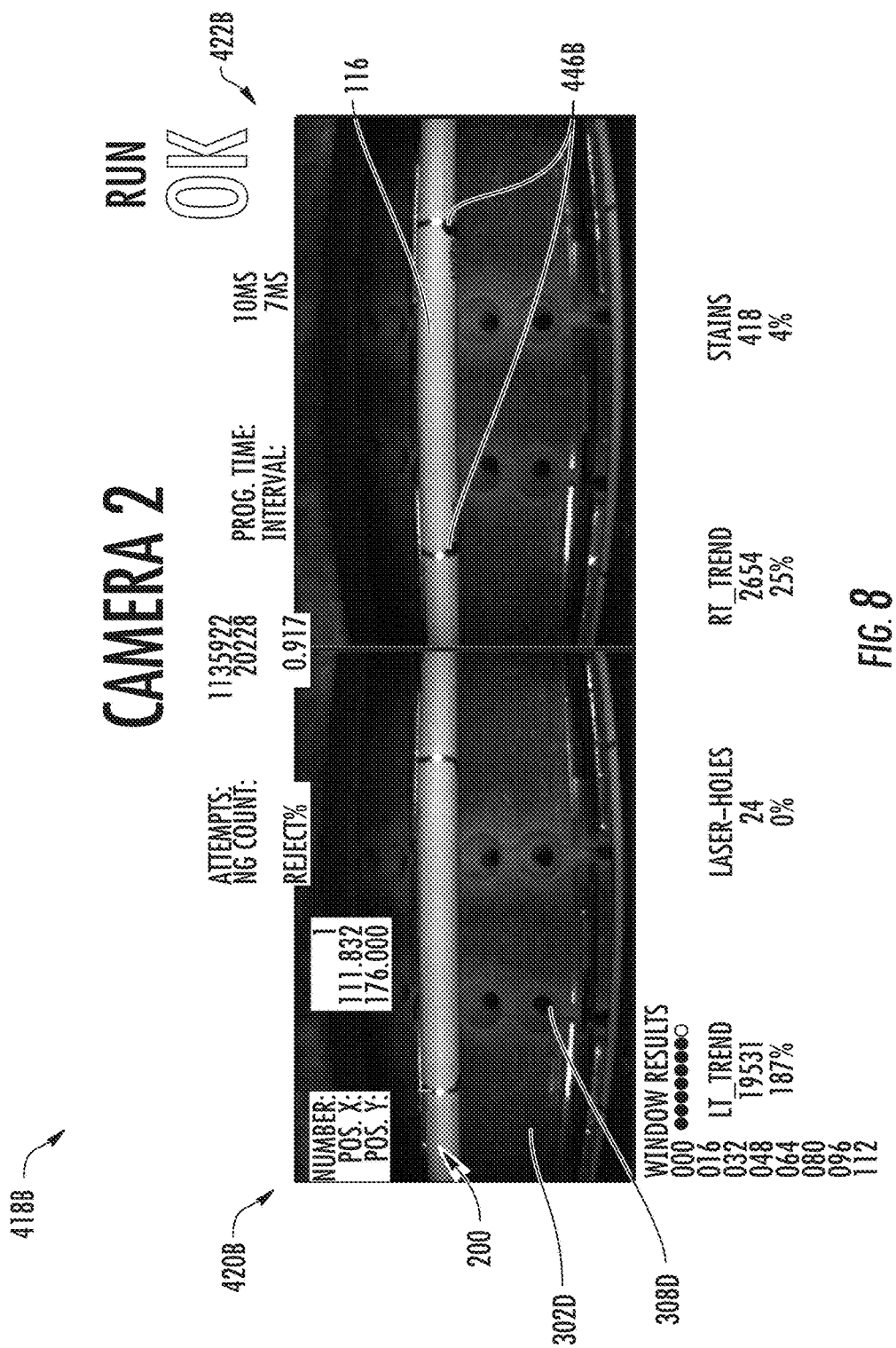
FIG. 8 is a screenshot from a monitor including images captured by the second imaging device according to an example embodiment of the present disclosure.

FIG. 8 illustrates an example screenshot 418B including first and second images 420B, 422B of at least a portion of the longitudinal length of the two-up smoking article assembly 200. The images 420B, 422B may be captured by the second imaging device 402B. The images 420B, 422B may be outputted on a monitor (e.g., monitor 410), which may be connected to one or more of the imaging devices 402A-D and/or the analysis unit 404.

In one embodiment the first image 420B is the most recent image captured by the second imaging device 402B. Accordingly, an operator may be apprised of the current status of the two-up filtered smoking article assemblies 200 before, during, or after formation of the perforations 120 therein, depending on the particular placement of the second imaging device 402B. In the illustrated embodiment, the second imaging device 402B is configured to capture images of the two-up smoking article assemblies 200 following formation of the perforations therein.

The second image 422B is the most recently-detected defective two-up filtered smoking article assembly 200 at the fourth drum 302D. Accordingly, the operator may also be apprised of detected defects occurring in the two-up filtered smoking article assemblies 200. Techniques and tools employed by the analysis unit 404 for detecting defects using the images 420B, 422B are discussed below.

After the perforations 120 are formed in the two-up smoking article assembly 200, the two-up smoking article assembly may be directed to the fifth drum 302E. A cutting device 312 may be positioned proximate the fifth drum 302E (see, FIG. 7). As schematically illustrated in FIG. 7, the cutting device 312, which may comprise a cutting wheel, may be positioned under and behind the fifth drum 302E in terms of the illustrated perspective. Accordingly, the two-up filtered smoking article assembly 200 may be divided into two individual, completed, as-formed smoking articles 100. Thereafter, after division of the two-up filtered smoking article assembly 200 into two smoking articles 100, the smoking articles may be transported downstream by transport drums 302F, G to the eighth drum 302H.

Figure 9:
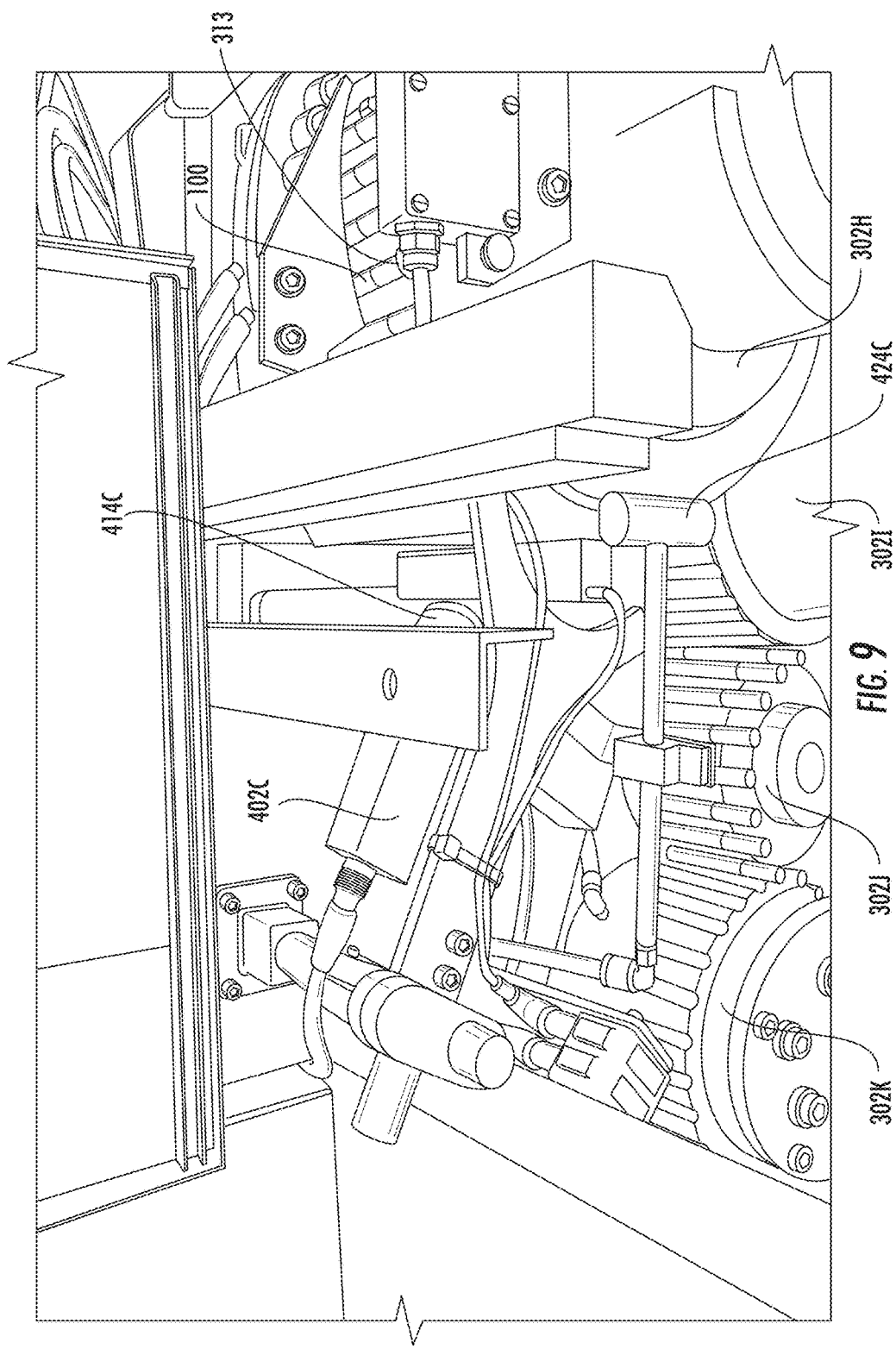
FIG. 9 illustrates an enlarged view of a third imaging device of the smoking article inspection system of FIG. 4 according to an example embodiment of the present disclosure.

FIG. 9 illustrates an enlarged perspective view of the eighth drum 302H and the third imaging device 402C. The eighth drum 302H may include a plurality of securing mechanisms 313 at the circumference thereof. The securing mechanisms 313 may be configured to engage one or both of the lighting end 108 and the mouth end 118 of a smoking article 100 (see, e.g., FIG. 1). For example, the securing mechanisms 313 may engage each smoking article 100 via friction and/or via vacuum applied to the smoking article through the securing mechanisms that acts upon the lighting end 108 and/or the mouth end 118 of the smoking article. In some embodiments the securing mechanisms 313 may be configured to rotate each of the smoking articles 100 about the respective longitudinal axes thereof.

Due to rotation of the eighth drum 302H, the smoking articles 100 may be directed in front of the third imaging device 402C. Further, by optionally rotating the smoking articles 100 about the longitudinal axes thereof using the securing mechanisms 313, the third imaging device 402C may capture the entirety of the circumference of at least a portion of the longitudinal length of each of the smoking articles 100. In this regard, the eighth drum 302H may comprise an inspection drum configured to facilitate inspection of the completed smoking articles 100.

As illustrated in FIG. 9, the third imaging device 402C may be generally aimed toward the circumference of the eighth drum 302H. Accordingly, the third imaging device 402C may be positioned, aimed, and focused to capture images of at least a portion of a longitudinal length of a completed smoking article 100. In this regard, as illustrated, a lens 414C of the third imaging device 402C may be directed at a location on the outer surface of the eighth drum 302H.

As noted above, various techniques may be employed to prevent build-up of debris on lenses of imaging devices. In this regard, whereas the third imaging device 402C is oriented at an upward angle in the embodiment of the smoking article inspection system 400 illustrated in FIG. 2, in another embodiment the imaging device 402C may be oriented at a downward angle, as shown in FIG. 9. Accordingly, build-up of debris on a lens 414C of the third imaging device 402C may be reduced. Further, the smoking article inspection system 400 may include a cleaning device 424C configured to direct a flow of air proximate the lens 414c of the third imaging device 402C or between the third imaging device and the eighth drum 302H during operation of the cigarette maker 300 to prevent collection of debris (e.g., tobacco crumbs, dust, etc.) on the lens of the third imaging device. As noted above, these apparatuses and techniques may be employed with any of the imaging devices discussed herein.

Figure 10:
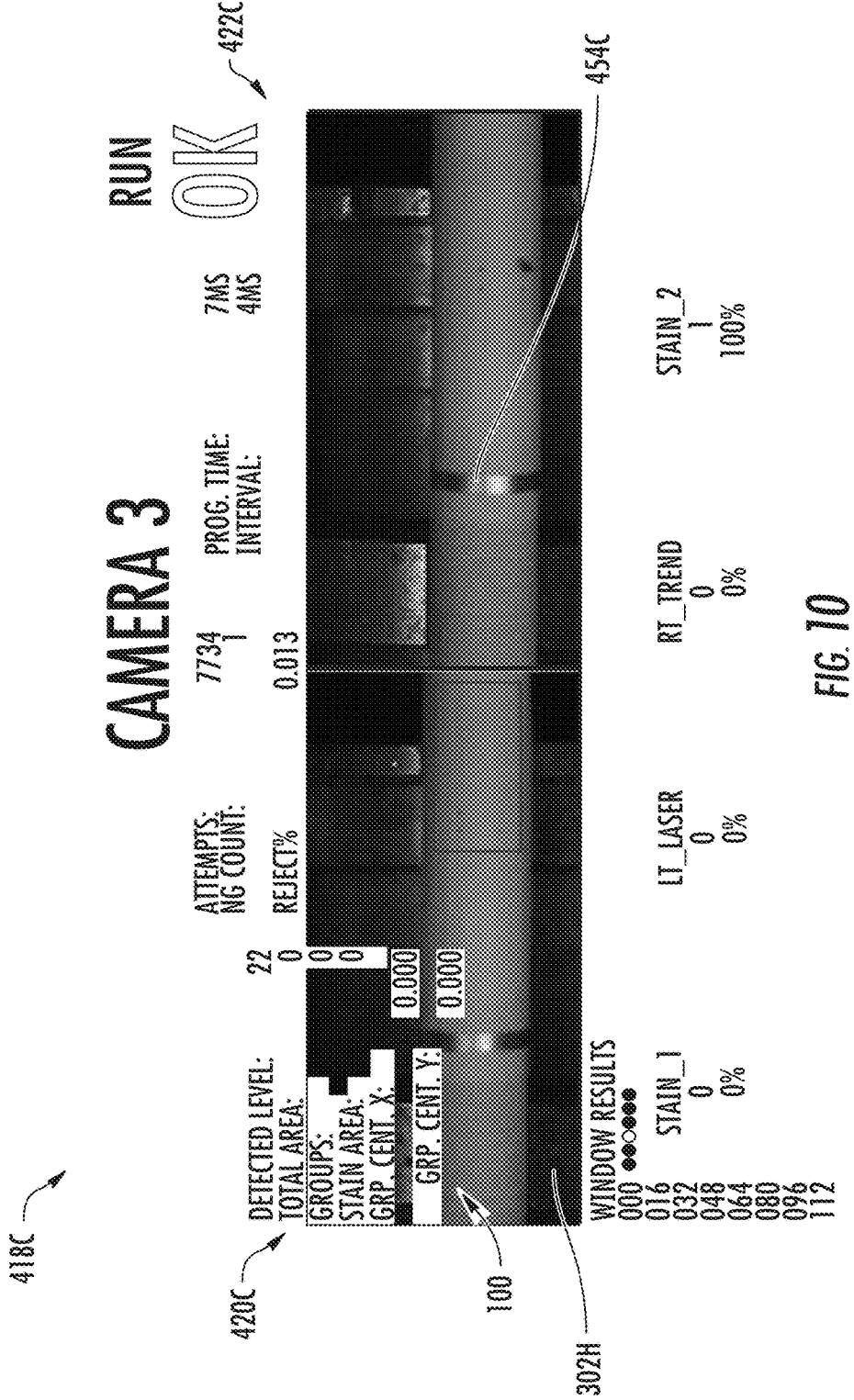
FIG. 10 is a screenshot from a monitor including images captured by the third imaging device according to an example embodiment of the present disclosure.

FIG. 10 illustrates an example screenshot 418C including first and second images 420C, 422C of at least a portion of the longitudinal length of the smoking article 100. The images 420C, 422C may be captured by the third imaging device 402C. The images 420C, 422C may be outputted on a monitor (e.g., monitor 410), which may be connected to one or more of the imaging devices 402A-D and/or the analysis unit 404.

In one embodiment the first image 420C is the most recent image captured by the third imaging device 402C. Accordingly, an operator may be apprised of the current status of the smoking articles 100 in their final, completed form. The second image 422C is the most recently-detected defective smoking article 100 at the eighth drum 302H. Accordingly, the operator may also be apprised of detected defects occurring in the smoking articles 100. Techniques and tools employed by the analysis unit 404 for detecting defects using the images 420C, 422C are discussed below.

Figure 11:
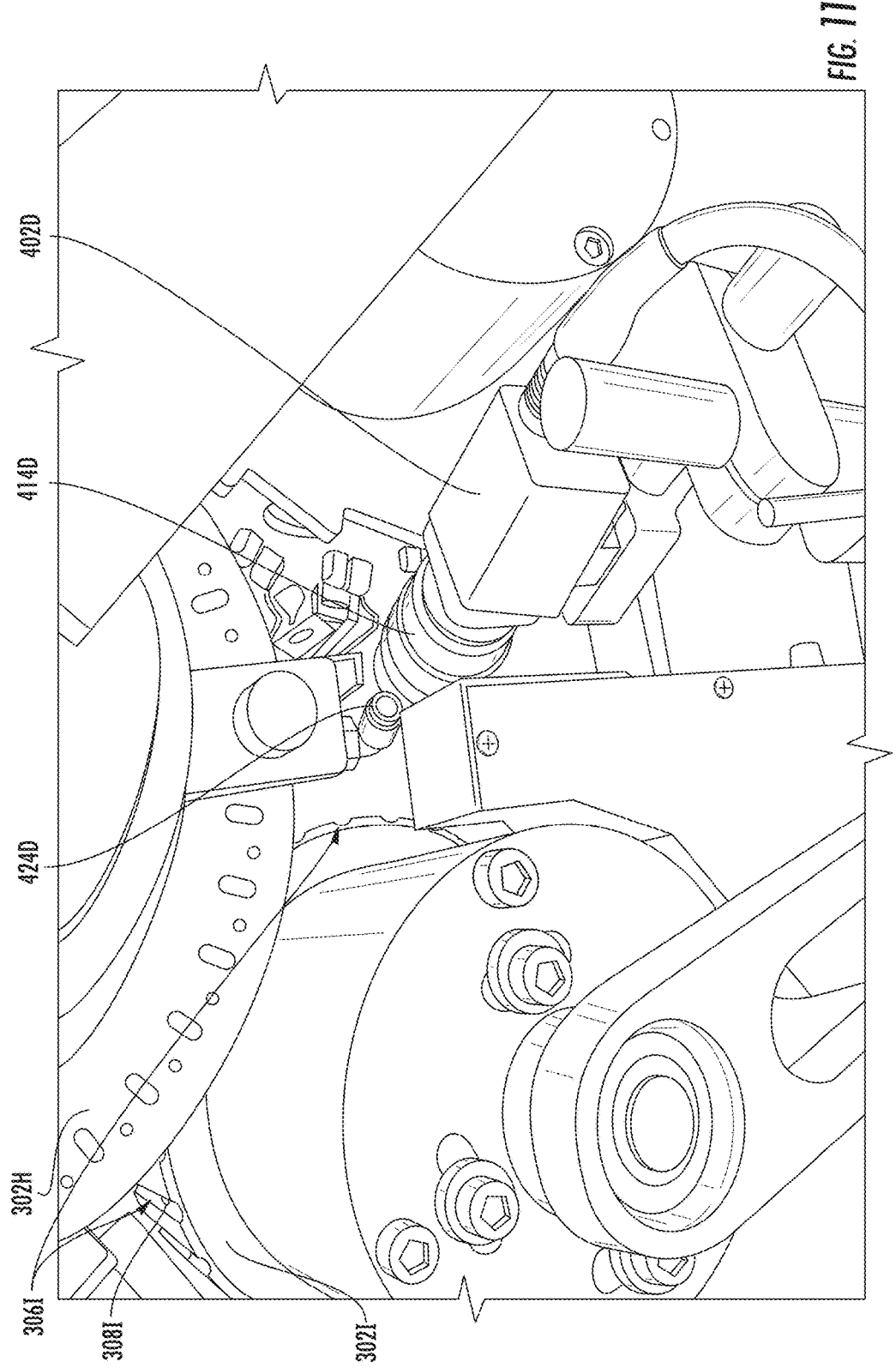
FIG. 11 illustrates an enlarged view of a fourth imaging device of the smoking article inspection system of FIG. 4 according to an example embodiment of the present disclosure.

After the smoking articles 100 are inspected at the eighth drum 302H, the smoking articles may be transferred to the ninth drum 302I. In this regard, FIG. 11 illustrates an enlarged perspective view of the ninth drum 302I and the fourth imaging device 402D. The ninth drum 302I may include a plurality of grooves, slots, or channels 306I at the circumference thereof oriented parallel to the rotational axis of the ninth drum. The channels 306I may be configured to respectively receive a completed smoking article 100. In order to retain the smoking articles 100 in the channels 306I, one or more suction ports 308I may be respectively positioned in the channels 306I. Accordingly, suction applied to the suction ports 308I may retain the smoking articles 100 in the channels 306I as the ninth drum 302I rotates.

Due to rotation of the ninth drum 302I, the smoking articles 100 may be directed in front of the fourth imaging device 402D. In this regard, as illustrated in FIG. 11, the fourth imaging device 402D may be generally aimed toward the outer edge of the ninth drum 302I. Thus, whereas the other imaging devices 402A-C may be configured to capture at least a portion of the longitudinal length of the smoking articles (e.g., at least including a tipping material, at which the majority of defects may occur), the fourth imaging device 402D may be positioned, aimed, and focused to capture images of a terminus of the smoking article. For example, in one embodiment the fourth imaging device 402D may capture images of the lighting end 108 of the smoking article 100. In another embodiment the fourth imaging device 400 may capture image of the mouth end 118 of the smoking article 100. Thus, whereas the other imaging devices 402A-C may be oriented substantially perpendicularly to a rotational axis of the drums associated therewith (e.g., within 30 degrees of perpendicular), the fourth imaging device 402D may be oriented substantially parallel with a rotational axis of the ninth drum 302I (e.g., within 30 degrees of parallel). Further, the smoking article inspection system 400 may include a cleaning device 424D configured to direct a flow of air at or proximate a lens 414D of the fourth imaging device 402D to prevent collection of debris thereon.

Figure 12:
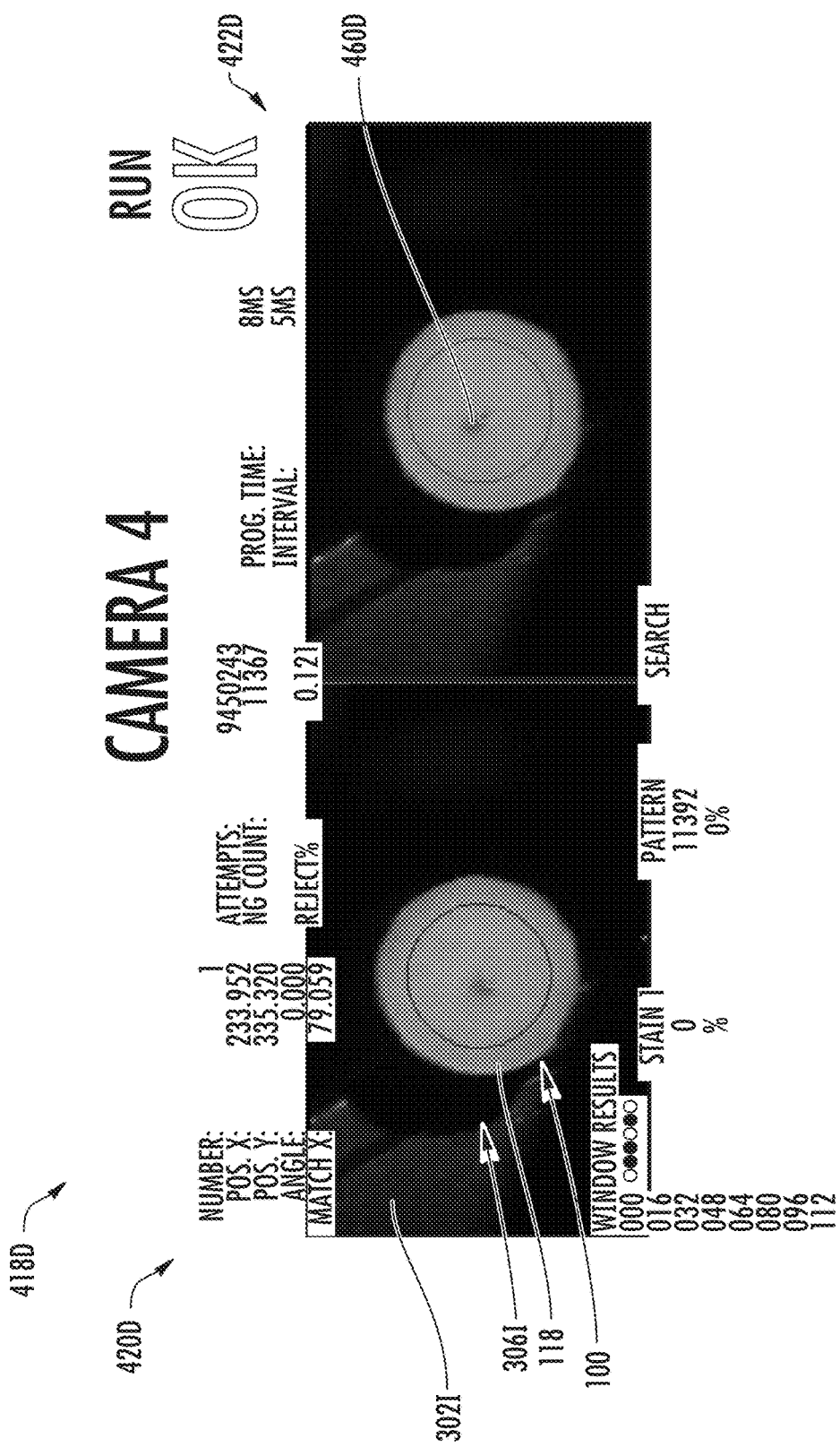
FIG. 12 is a screenshot from a monitor including images captured by the fourth imaging device according to an example embodiment of the present disclosure.

FIG. 12 illustrates an example screenshot 418D including first and second images 420D, 422D of a terminus of the smoking article 100. More particularly, the images 420D, 422D illustrate the mouth end 118 of the smoking article 100. The images 420D, 422D may be captured by the fourth imaging device 402D. The images 420D, 422D may be outputted on a monitor (e.g., monitor 410), which may be connected to one or more of the imaging devices 402A-D and/or the analysis unit 404.

In one embodiment the first image 420D is the most recent image captured by the fourth imaging device 402D. Accordingly, an operator may be apprised of the current status of the smoking articles 100 in their final, completed form. The second image 422D may be the most recently-detected defective smoking article 100 at the ninth drum 302I. Accordingly, the operator may also be apprised of detected defects occurring in the smoking articles 100. Techniques and tools employed by the analysis unit 404 for detecting defects using the images 420D, 422D are discussed below.

Figure 13:
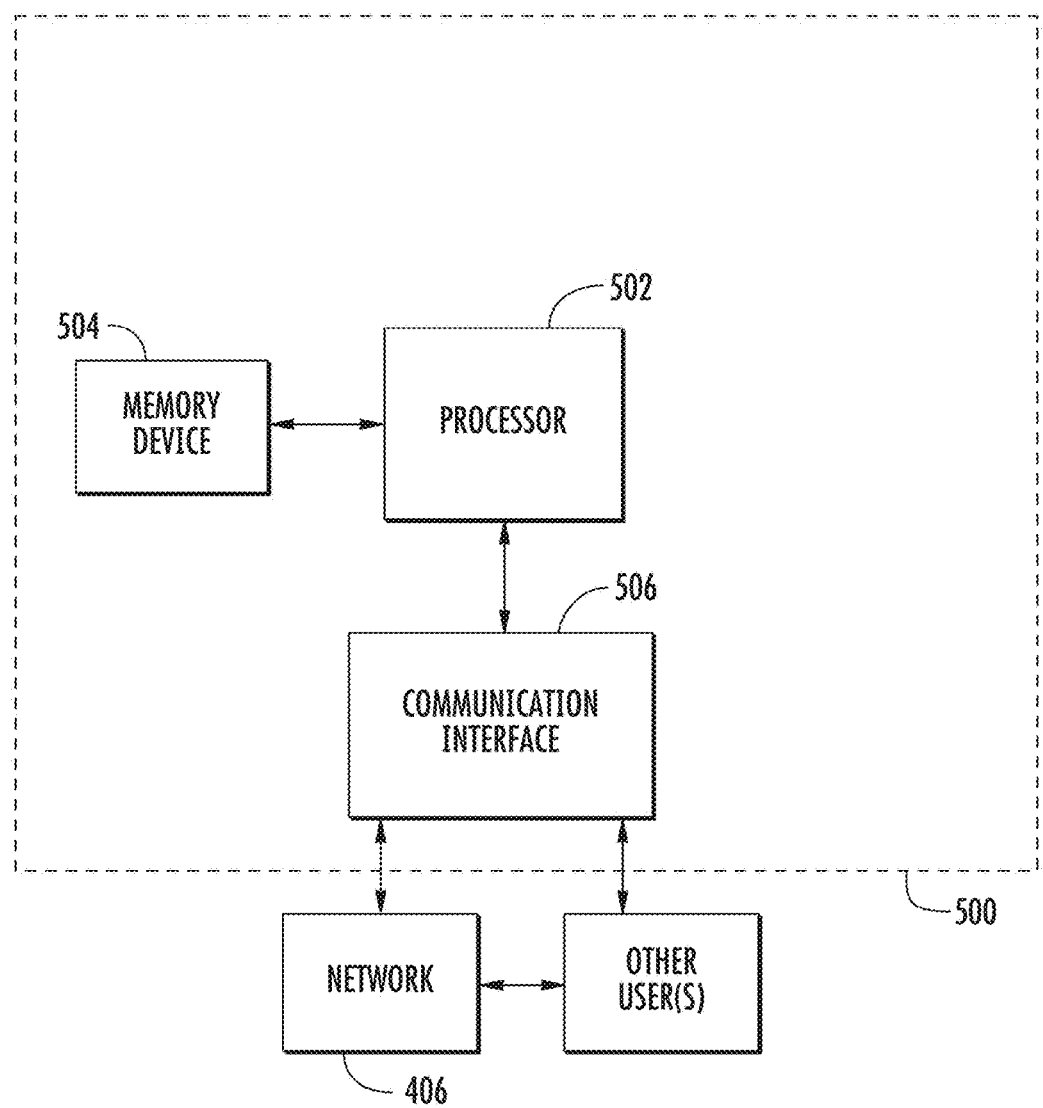
FIG. 13 illustrates a schematic view of components of an analysis unit of the smoking article inspection system of FIG. 4 according to an example embodiment of the present disclosure.
Figure 14:
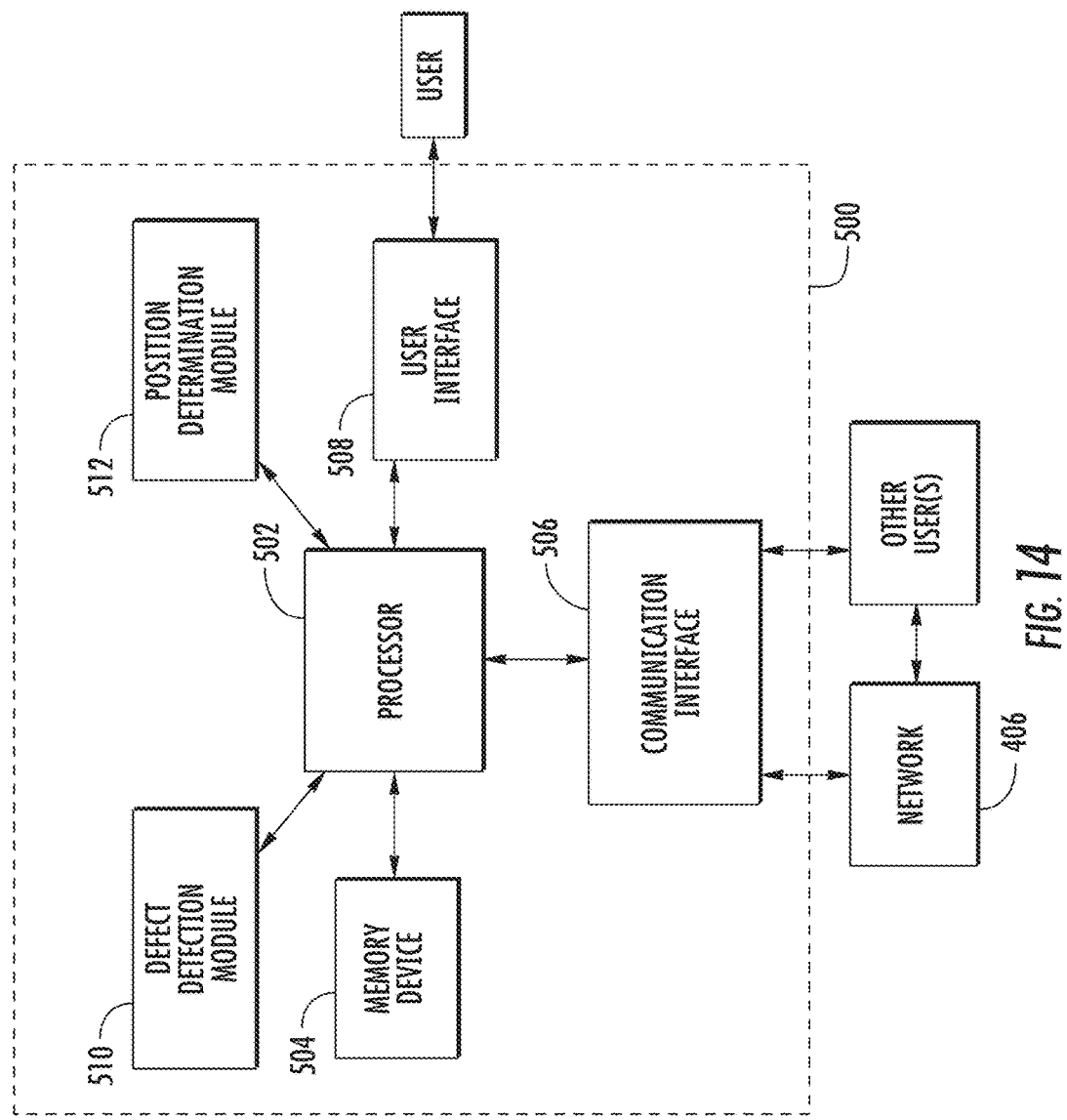
FIG. 14 illustrates a schematic view of the analysis unit of FIG. 13 including additional components according to an example embodiment of the present disclosure.

In example embodiments illustrated in FIGS. 13 and 14, an apparatus 500 is provided that may be employed by devices performing functions in accordance with example embodiments of the present disclosure. The apparatus 500 may be embodied, for example, as any device hosting, including, controlling, comprising, or otherwise forming a portion of the imaging devices 402A-D, the analysis unit 404, and/or the monitors 408. In a preferred embodiment the apparatus 500 may be embodied in or as the analysis unit 404. However, embodiments of the apparatus 500 may also be embodied on a plurality of other devices such as for example where instances of the apparatus may be embodied on the network 408. As such, embodiments of the apparatus 500 illustrated in FIGS. 13 and 14 are merely examples and may include more, or in some cases, less than the components shown in FIGS. 13 and 14.

With further regard to FIGS. 13 and 14, the apparatus 500 may be configured to analyze the images captured by the imaging devices 402A-D and/or other data captured by the inspection apparatus 402. As depicted in FIG. 13, the apparatus 500 may include or otherwise be in communication with a processor 502, a memory device 504, and a communication interface 506. The memory device 504 may include non-transitory and tangible memory that may be, for example, volatile and/or non-volatile memory. The memory device 504 may be configured to store information, data, files, applications, instructions or the like. For example, the memory device 504 could be configured to buffer input data for processing by the processor 502. Additionally or alternatively, the memory device 504 could be configured to store instructions for execution by the processor 502.

The apparatus 500 may, in some embodiments, be a user terminal or a fixed communication device or computing device such as a server configured to employ an example embodiment of the present disclosure. However, in some embodiments, the apparatus 500 may be physically embodied as a chip or chip set. The chip or chipset may constitute means for performing one or more operations for providing the functionalities described herein.

The processor 502 may be embodied in a number of different ways. For example, the processor 502 may be embodied as one or more of various processing means such as a coprocessor, a microprocessor, a controller, a digital signal processor (DSP), processing circuitry, or various other processing devices including integrated circuits such as, for example, a special-purpose computer chip, or other hardware processor. In an example embodiment, the processor 502 may be configured to execute instructions stored in the memory device 504 or otherwise accessible to the processor. Alternatively or additionally, the processor 502 may be configured to execute hard coded functionality. As such, the processor 502 may be capable of performing operations according to embodiments of the present disclosure while configured accordingly. Alternatively, when the processor 502 is embodied as an executor of software instructions, the instructions may specifically configure the processor to perform the operations described herein. The processor 502 may include a clock, an arithmetic logic unit (ALU) and logic gates configured to support operation of the processor, amongst other components.

The communication interface 506 may be any means such as a device or circuitry embodied in either hardware, software, or a combination thereof that is configured to receive and/or transmit data. In this regard, the communication interface 506 may include, for example, an antenna and supporting hardware and/or hardwired components and/or software. Accordingly, the communication interface 506 may provide for communication with external devices such as the network 406, the imaging devices 402A-D, and the monitors 408.

As mentioned above, embodiments of the apparatus 500 may include more, or in some cases less, than the components shown in FIG. 13. In this regard, FIG. 14 illustrates an embodiment of the apparatus 500 comprising additional components or modules configured to analyze images captured by the imaging devices 402A-D or other data provided by the inspection apparatus 402 as discussed in detail below. The apparatus 500 may include or otherwise be in communication with the processor 502, the memory device 504, and the communication interface 506 as described above with respect to FIG. 13.

In some embodiments the apparatus 500 may further comprise a user interface 508. The user interface 508 may be in communication with the processor 502 to receive an indication of a user input at the user interface and/or to provide an audible/visible, mechanical (e.g., haptic) or other output to the user. As such, the user interface 502 may include, for example, a keyboard, a mouse, a joystick, a display/monitor, a touch screen, a microphone, a speaker, a dial, and/or other input/output mechanisms. The processor 502 may be configured to control at least some functions of one or more elements of the user interface 508.

In some embodiments the apparatus 500 may further comprise a defect detection module 510. The processor 502 may be configured to control at least some functions of one or more elements of the defect detection module 510. The defect detection module 510 may be configured to execute a defect detection tool configured to determine whether a smoking article is defective based on the data provided by the inspection apparatus 402. Thus, for example, the defect detection tool may determine whether a smoking article is defective based on images captured by the imaging devices 402A-D. In this regard, the defect detection tool may be configured to determine an edge location of the tipping material, detect a plurality of perforations extending through the tipping material and spacing thereof, detect a contrast between a dark portion and a light portion of the smoking article, determine a color of the smoking article, detect a pattern, identify segments of the filter element, and/or perform various other functions configured to detect defects. Some defects that may be detected include tobacco crumbs under the tipping material, patches of tipping material glued to a drum, extra patches of tipping material, tobacco that is glued between the filter and the tobacco rod, wrinkled tipping material, laser holes that are on top of one another as opposed to properly spaced apart (e.g., due to the smoking article not rolling correctly on the fourth drum 302D), exposed capsules or charcoal at the mouth end of the filter element, absence of a string in the filter element (in embodiments of smoking articles including string filter elements), missing tipping material, misaligned (e.g., tilted tipping material), improperly positioned tipping material (e.g., along the longitudinal axis of the smoking article), misaligned tobacco rod and filter element (e.g., non-axial alignment), etc. Various other examples of defects that may be detected are described below.

In some embodiments the apparatus 500 may further comprise a position determination module 512. The processor 502 may be configured to control at least some functions of one or more elements of the position determination module 512. The position determination module 512 may be configured to determine a position of the smoking article. For example, the position determination module may be configured to execute an edge detection tool configured to determine a position of the smoking article based on an edge location of the smoking article. The edge detection tool may be configured to detect the location of various edges of the smoking article. For example, the edge detection tool may detect edges at an outer perimeter of the smoking article (e.g., upper and lower horizontal edges (x-axis) and left and right vertical edges (y-axis) at the termini of the smoking article or the two-up smoking article assembly). The edge location of various other features of the smoking article (e.g., vertical and horizontal edges of the tipping material and/or edges of any other of the components of the smoking article and/or interfaces therebetween) may also be detected in order to determine a position of the smoking article. The edges may be detected for both the tobacco rod and the filter element in some embodiments to determine the position of the smoking article.

The defect detection module 510 may function in conjunction with the position determination module 512. In this regard, the position of the smoking article may be employed in the determination of whether the smoking article is defective. For example, the alignment of the tipping material may be compared to the overall alignment of smoking article. Thus, whether the smoking article is defective may be determined after the position of the smoking article is determined in some embodiments.

Figure 15:
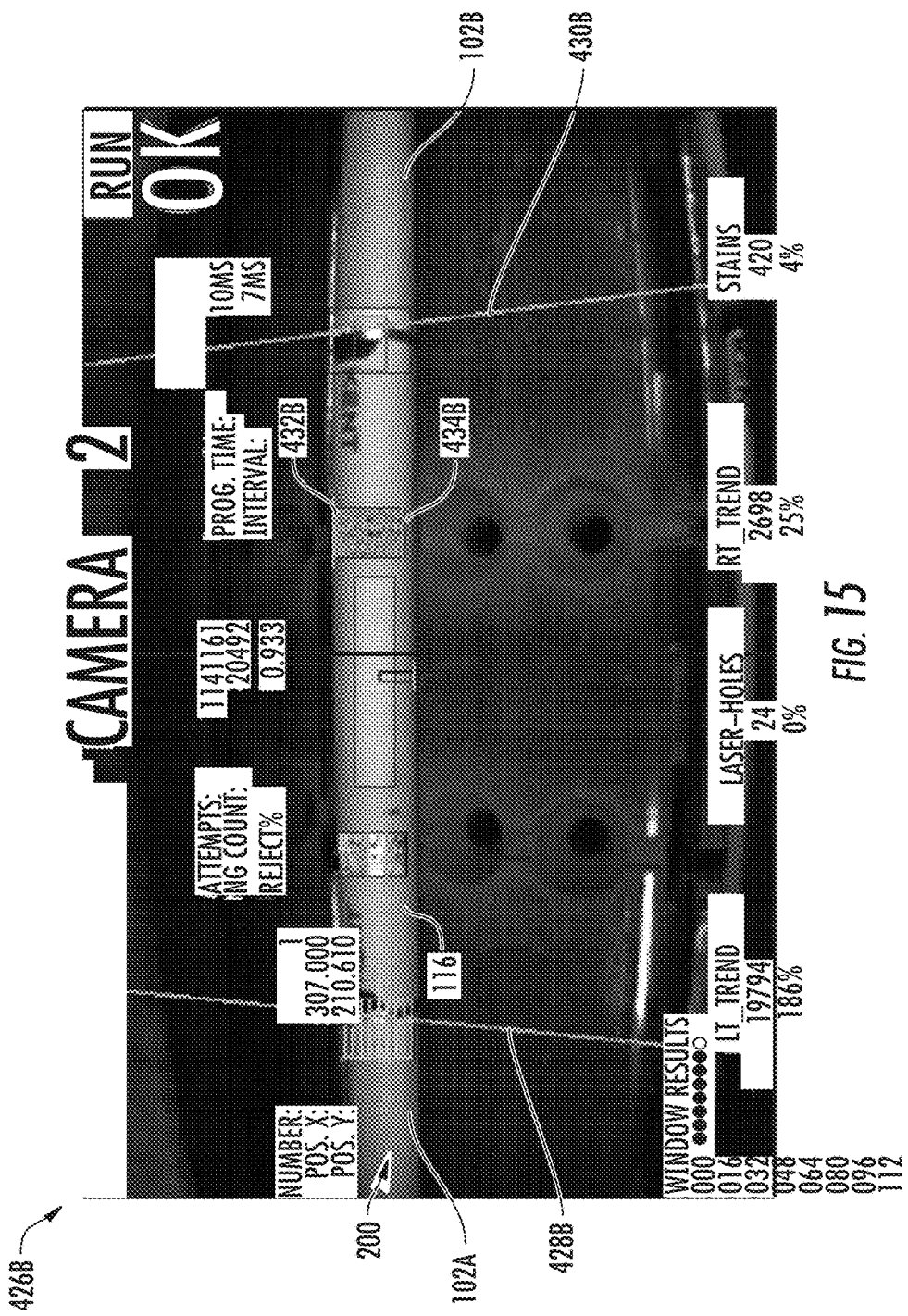
FIG. 15 is a screenshot from a monitor showing detection of edge locations of a two-up smoking article assembly according to an example embodiment of the present disclosure.

By way of example, FIG. 15 illustrates execution of the edge detection tool in relation to an image 426B of the two-up smoking article assembly 200 which may be captured by the second imaging device 402B. As illustrated, the edge detection tool may detect left and right edges 428B, 430B of the tipping material 116. Further, the edge detection tool may detect upper and lower edges 432B, 434B of the tipping material 116. Accordingly, based on these edge locations and/or locations of various other portions or components of the smoking article, the position of the tipping material and/or the smoking article may be determined. In this regard, detection of one edge location may provide information with respect to the position of the smoking article. However, detection of a second edge may provide additional information. In this regard, if the smoking article is bent or otherwise structurally misconfigured, detection of a single edge may provide incomplete information with respect to the position of the smoking article. Further, detection of multiple edges may provide information with respect to the size of the smoking article or components thereof, which provides additional positional information. Note that the position of the smoking article may additionally or alternatively be determined based off of the position of the tobacco rod and/or other components of the smoking article other than the tipping material to later determine whether the tipping material is properly aligned with the remainder of the smoking article in some embodiments. Accordingly, determination of first and second edge locations may include determination of boundaries (e.g., external boundaries) of the smoking article or components thereof.

Thus, as described by way of example with respect to FIG. 15, the position of the smoking article, in any state of assembly (e.g., embodied as completed smoking articles 100 or as two-up smoking article assemblies 200), may be determined. Thereafter, the defect detection tool may detect any defects in the smoking article. In this regard, FIGS. 16A-D illustrate various examples of defects that may be detected in images that may be captured by the first imaging device 402A. Various example of defects that may be detected in images captured by the first imaging device 402A include the absence of the tipping material, skewed tipping material, mispositioned tipping material (e.g., along the longitudinal axis of the smoking article), and debris and stains. Note that in the illustrated embodiment the first imaging device captures images of the tipping material during attachment to the two-up smoking article assemblies. Thus, by determining the position of an upper edge, a lower edge, and/or side edges of the partially attached tipping material and determining the position of the remainder of the smoking article, it may be possible to determine whether the tipping material is properly aligned with the smoking article prior to completing wrapping the tipping material about the smoking article.

By way of particular examples, FIG. 16A illustrates an image of a two-up smoking article assembly 200 including an improperly-attached tipping material 116. In this regard, FIG. 16A illustrates a defect in the form of a simulated gap 432A which may be detected. For example, the gap 432A may be detected by determining a color of the smoking article and determining that a detected color of the smoking article (e.g., black) does not match a desired color of the smoking article (e.g., white). Similarly, the defect detection tool may detect a contrast between the gap 432A (a dark portion) and the remainder of the tipping material 116 (a light portion) to determine that there is a defect. The gap 432A may also be detected by determining edge locations of the tipping material 116, wherein the lower edge of the tipping material is out of place with respect to the remainder of the smoking article.

FIGS. 16B-D illustrate additional example defects that may be detected in images that may be captured by the first imaging device 402A. FIG. 16B illustrates a two-up smoking article assembly 200 to which a second tipping material 434A is improperly attached. The second tipping material 434A may be detected by the defect detection tool by determining the locations of the edges of the tipping materials 116, 434A, which may deviate from the desired positions. Further, detection of the edge locations may indicate that the tipping material 116 is wrinkled. FIG. 16C illustrates a two-up smoking article assembly 200 in which debris 436A (e.g., tobacco crumbs) are on the tipping material 116. The tobacco crumbs 436A may be detected by the color or contrast thereof. FIG. 16D illustrates a two-up smoking article assembly 200 in which a stray partial patch of tipping material 438A is attached thereto. The stray partial patch of tipping material 438A may be detected by the defect detection tool by determining the locations of the edges of the tipping materials 116, 438A, which may deviate from the desired positions.

Further, returning to FIG. 6, the image 422A includes a defect in the form of debris 440A such as tobacco crumbs, which may be detected by the color or contrast thereof. Note also, as illustrated in FIG. 6, that various segments of the two-up filter segment 202 are visually identifiable (e.g., via contrast and/or color) in the image 422A, which may be captured by the first imaging device 402A. Accordingly, defects with respect to the filter element missing segments thereof or including improperly arranged segments may be detected based on deviations from an expected pattern (e.g., patterns of color or contrast).

FIGS. 17A and 17B illustrate examples of defects that may be detected in images that may be captured by the second imaging device 402B. In one embodiment the tipping material 116 should be completely attached to the remainder of the smoking article at the point at which the second imaging device 402B captures images of the smoking article. Various example of defects that may be detected by images captured by the second imaging device 402B include the absence of the tipping material, skewed/tilted tipping material, mispositioned tipping material (e.g., along the longitudinal axis of the smoking article), debris and stains, tobacco at the edge of the tipping material, and absence or mispositioning of the perforations. By way of particular examples, FIG. 17A illustrates an image of a two-up smoking article assembly 200 including simulated debris, stains, or damage 442B, which may be detected by the color or contrast thereof. Further, FIG. 17B illustrates an image of a two-up smoking article assembly 200 wherein the tipping material 116 includes a loose end 444B, which may be detected by determining edge locations of the tipping material. Returning to FIG. 8, image 422B illustrates simulated debris 446B at the ends of the tipping material 116.

FIGS. 18A-D illustrate examples of defects that may be detected in images that may be captured by the third imaging device 402C. Various examples of defects that may be detected in images captured by the second imaging device 402B include the absence of the tipping material, skewed/tilted tipping material, mispositioned tipping material (e.g., along the longitudinal axis of the smoking article), debris, damage, stains, tobacco at the edge of the tipping material, and absence or mispositioning of the perforations. By way of particular examples, FIGS. 18A and 18B illustrate images of smoking articles 100 including simulated debris or damage 448C, 450C, which may be detected by the color or contrast thereof. Further, FIG. 18C illustrates an image of a smoking article 100 wherein the tipping material 116 does not include the perforations 120, which may be determined by failing to detect a pattern associated with the perforations. Additionally, FIG. 18D illustrates an image of a smoking article, wherein debris 452C (e.g., tobacco crumbs) is present, which may be detected by the color or contrast thereof, and the tipping material 116 is poorly wrapped, which may be detected by determining an edge location of the end of the tipping material. Returning to FIG. 10, image 422C illustrates debris 454C on the tipping material 116.

FIGS. 19A-D illustrate examples of defects that may be detected in images that may be captured by the fourth imaging device 402D of the mouth end 118 of the filter material 112. In FIGS. 19A-B the images are captured at a slight angle with respect to the longitudinal axis of the smoking articles 100 (e.g., within 30 degrees of parallel), whereas in FIGS. 19C and 19D the images are captured at an angle parallel to the longitudinal axis of the smoking articles. In FIGS. 19A and 19B the smoking article 100 includes a filter element with a traditional, plain mouth end 118, whereas the smoking articles in FIGS. 19C and 19D include so-called "straw" filter elements which include a recessed middle portion. Various examples of defects that may be detected in images captured by the second imaging device 402B include the absence of a string, presence of an exposed or visible capsule, out-of-round or otherwise deformed filter elements, debris, damage, and stains.

By way of particular example, FIG. 19A illustrates an image of a smoking article 100 including simulated debris 456D configured to simulate exposed charcoal at the mouth end 118 of the filter material 112, which may be detected by the color or contrast thereof relative to the expected color of the filter material. FIG. 19B illustrates an image of a smoking article 100 including a defect 458D in the form of a stain or exposed capsule at the mouth end 118 of the filter material 112, which may be detected by the color or contrast thereof relative to the expected color of the filter material (e.g., white). FIG. 19C illustrates an image of a smoking article 100 wherein the mouth end 118 deviates from a desired round configuration, which may be detected by determining an outer and/or inner edge of the mouth end of the smoking article or by failing to detect an expected pattern (e.g., a round shape) of the mouth end of the smoking article. FIG. 19D illustrates an image of a smoking article 100 wherein the mouth end 118 includes a damaged portion, which may be detected by determining an inner edge location of the mouth end of the smoking article or by failing to detect an expected pattern (e.g., a round shape) of the inner portion of the mouth end of the smoking article. Returning to FIG. 12, image 422D illustrates the end of a smoking article 100 including a misplaced string 460D, wherein the position of the string extending through the filter element differs from a desired position (e.g., coaxial with a longitudinal axis of the smoking article). The misplaced string 460D may be detected by the color or contrast thereof relative to the color of the filter material and the position thereof may be compared to a desired position.

Thus, as described above, various defects in the smoking articles may be detected. Further, these defects may be detected during assembly of the smoking article. In this regard, assembly of the smoking article may include a plurality of operations, as described above. For example, the operations may include attaching the tipping material, cutting the perforations in the filter, and dividing the two-up smoking article assembly. Accordingly, when the analysis unit 404 determines that a smoking article is defective, the analysis unit may be further configured to determine the one of the operations causing damage to the smoking article from analysis of the images of the smoking article. Thus, as described above defective smoking articles may be removed at various points during the assembly process and/or repairs or adjustments may be made to the particular operations causing the defects. Accordingly, the assembly process may be improved relative to embodiments in which the smoking articles are only inspected after completion.

As noted above, in one embodiment the inspection apparatus 402 may include one or more imaging devices 402A-D. However, the inspection apparatus may include various alternative or additional devices in other embodiments. For example, in one embodiment the inspection apparatus may include one or more microphones that may detect sounds occurring during the production of smoking articles. Accordingly, variations in sounds from expected sounds may indicate that an error is occurring in the production process that could cause defects in the smoking articles. For example, when a piece of tipping material becomes attached to one of the drums, the piece of tipping material may produce certain sounds during rotation therewith. Accordingly, the microphone may detect any abnormal noises by comparing detected noises to noises associated with proper operation of the cigarette maker.

Figure 20:
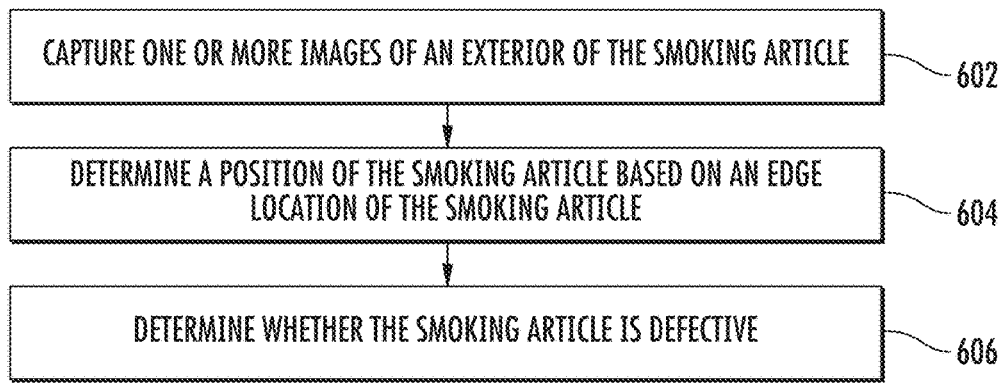
FIG. 20 schematically illustrates a method for inspecting a smoking article including determining a position of the smoking article according to an example embodiment of the present disclosure.

In an additional aspect methods for inspecting a smoking article comprising a smokable rod and a filter element connected by a tipping material are provided. In this regard, the method illustrated in FIG. 20 includes capturing one or more images of an exterior of the smoking article at operation 602. Further, the method may include determining a position of the smoking article based on an edge location of the smoking article at operation 604. Additionally, the method may include determining whether the smoking article is defective at operation 606 after the position of the smoking article is determined at operation 604.

In some embodiments the method may further comprise determining a second edge location of the smoking article to determine a plurality of boundaries of the smoking article. Additionally, determining whether the smoking article is defective may include at least one of determining an edge location of the tipping material, detecting a plurality of perforations extending through the tipping material, detecting a contrast between a dark portion and a light portion of the smoking article, determining a color of the smoking article, detecting a pattern, and identifying segments of the filter element. Further, capturing the one or more images of the exterior of the smoking article at operation 602 may include capturing the one or more images of a longitudinal length of a two-up filtered smoking article assembly during application of the tipping material thereto, capturing the one or more images of the longitudinal length of the two-up filtered smoking article assembly after creation of a plurality of perforations extending through the tipping material, capturing the one or more images of the longitudinal length of the smoking article after division of the two-up filtered smoking article assembly, and capturing the one or more images of a terminus of the smoking article. The method may further include directing a flow of air proximate one or more imaging devices configured to capture the one or more images to prevent collection of debris thereon.

Figure 21:
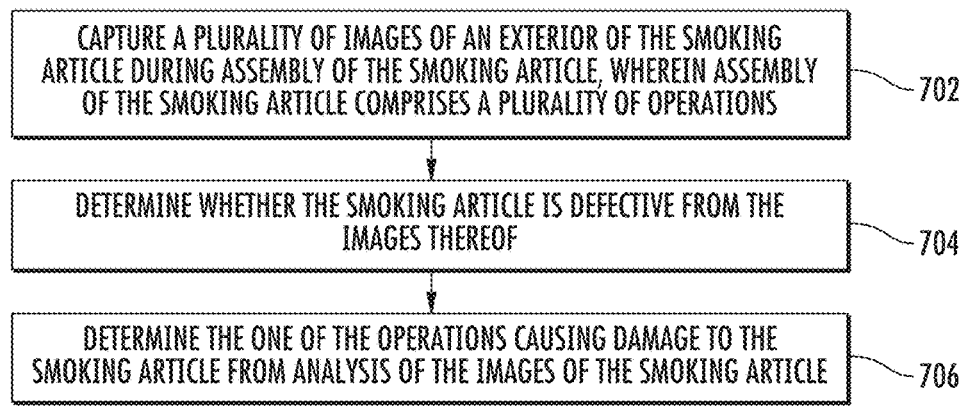
FIG. 21 schematically illustrates a method for inspecting a smoking article including determining the operations causing damage to the smoking article according to an example embodiment of the present disclosure.

FIG. 21 illustrates an additional method for inspecting a smoking article comprising a smokable rod and a filter element connected by a tipping material. As illustrated, the method may include capturing a plurality of images of an exterior of the smoking article during assembly of the smoking article, wherein assembly of the smoking article comprises a plurality of operations at operation 702. Additionally, the method may include determining whether the smoking article is defective from the images thereof at operation 704. Further, if the smoking article is determined to be defective, the method may include determining the one of the operations causing damage to the smoking article from analysis of the images of the smoking article of the smoking article at operation 706.

In some embodiments the method may further comprise determining a position of the smoking article based on an edge location of the smoking article before determining whether the smoking article is defective. Additionally, the method may include determining a second edge location of the smoking article to determine a plurality of boundaries of the smoking article. Determining whether the smoking article is defective at operation 704 may comprise at least one of determining an edge location of the tipping material, detecting a plurality of perforations extending through the tipping material, detecting a contrast between a dark portion and a light portion of the smoking article, determining a color of the smoking article, detecting a pattern, and identifying segments of the filter element. Capturing the one or more images of the exterior of the smoking article at operation 702 may comprise at least one of capturing the one or more images of a longitudinal length of a two-up filtered smoking article assembly during application of the tipping material thereto, capturing the one or more images of the longitudinal length of the two-up filtered smoking article assembly after creation of a plurality of perforations extending through the tipping material, capturing the one or more images of the longitudinal length of the smoking article after division of the two-up filtered smoking article assembly, and capturing the one or more images of a terminus of the smoking article. The method may further comprise directing a flow of air proximate one or more imaging devices configured to capture the one or more images to prevent collection of debris thereon.

Many modifications and other embodiments of the disclosure will come to mind to one skilled in the art to which this disclosure pertains having the benefit of the teachings presented in the foregoing descriptions and the associated drawings. Therefore, it is to be understood that the disclosure is not to be limited to the specific embodiments disclosed herein and that modifications and other embodiments are intended to be included within the scope of the appended claims. Although specific terms are employed herein, they are used in a generic and descriptive sense only and not for purposes of limitation.

What is claimed is:

1. A smoking article inspection system configured to inspect a smoking article comprising a smokable rod and a filter element connected by a tipping material, the smoking article inspection system comprising:
   one or more imaging devices configured to respectively capture one or more images in a visible light spectrum of an exterior surface of the smoking article as the smoking article is supported in a groove defined by a circumferential surface of a drum and oriented parallel to a rotational axis of the drum, the one or more imaging devices being positioned to capture the plurality of images substantially perpendicular to the rotational axis of the drum; and
   an analysis unit configured to analyze the images captured by the one or more imaging devices, the analysis unit being configured to execute:
      an edge detection tool configured to determine a position of the smoking article based on an edge location of the smoking article; and
      a defect detection tool configured to determine whether the smoking article is defective after the position of the smoking article is determined.

2. The smoking article inspection system of claim 1, wherein the edge detection tool is further configured to determine a second edge location of the smoking article to determine a plurality of boundaries of the smoking article.

3. The smoking article inspection system of claim 1, wherein the defect detection tool is configured to perform at least one of:
   determining an edge location of the tipping material;
   detecting a plurality of perforations extending through the tipping material;
   detecting a contrast between a dark portion and a light portion of the smoking article;
   determining a color of the smoking article;
   detecting a pattern; and
   identifying segments of the filter element.

4. The smoking article inspection system of claim 1, wherein the one or more imaging devices comprise at least one of:
   an imaging device configured to capture the one or more images of a longitudinal length of a two-up filtered smoking article assembly during application of the tipping material thereto;
   an imaging device configured to capture the one or more images of the longitudinal length of the two-up filtered smoking article assembly after creation of a plurality of perforations extending through the tipping material;
   an imaging device configured to capture the one or more images of the longitudinal length of the smoking article after division of the two-up filtered smoking article assembly; and
   an imaging device configured to capture the one or more images of a terminus of the smoking article.

5. The smoking article inspection system of claim 1, further comprising a cleaning device configured to direct a flow of air proximate at least one of the one or more imaging devices to prevent collection of debris thereon.

6. A smoking article inspection system configured to inspect a smoking article comprising a smokable rod and a filter element connected by a tipping material, the smoking article inspection system comprising:
   a plurality of imaging devices configured to respectively capture one or more images in a visible light spectrum of an exterior surface of the smoking article as the smoking article is supported in a groove defined by a circumferential surface of a drum and oriented parallel to a rotational axis of the drum, the one or more imaging devices being positioned to capture the plurality of images substantially perpendicular to the rotational axis of the drum, the one or more imaging devices being configured to capture the one or more images of the smoking article during assembly of the smoking article, wherein assembly of the smoking article comprises a plurality of operations; and an analysis unit configured to analyze the images captured by the imaging devices, the analysis unit being configured to execute a defect detection tool configured to determine whether the smoking article is defective from the images thereof, and, if the smoking article is determined to be defective, to determine the one of the operations causing damage to the smoking article from analysis of the images of the smoking article captured during assembly.

7. The smoking article inspection system of claim 6, wherein the analysis unit is further configured to execute an edge detection tool configured to determine a position of the smoking article based on an edge location of the smoking article, the defect detection tool being configured to determine whether the smoking article is defective after the position of the smoking article is determined.

8. The smoking article inspection system of claim 7, wherein the edge detection tool is further configured to determine a second edge location of the smoking article to determine a plurality of boundaries of the smoking article.

9. The smoking article inspection system of claim 6, wherein the defect detection tool is configured to perform at least one of:
   determining an edge location of the tipping material;
   detecting a plurality of perforations extending through the tipping material;
   detecting a contrast between a dark portion and a light portion of the smoking article;
   determining a color of the smoking article;
   detecting a pattern; and
   identifying segments of the filter element.

10. The smoking article inspection system of claim 6, wherein the imaging devices comprise at least one of:
   an imaging device configured to capture the one or more images of a longitudinal length of a two-up filtered smoking article assembly during application of the tipping material thereto;
   an imaging device configured to capture the one or more images of the longitudinal length of the two-up filtered smoking article assembly after creation of a plurality of perforations extending through the tipping material;
   an imaging device configured to capture the one or more images of the longitudinal length of the smoking article after division of the two-up filtered smoking article assembly; and
   an imaging device configured to capture the one or more images of a terminus of the smoking article.

11. The smoking article inspection system of claim 6, further comprising a cleaning device configured to direct a flow of air proximate at least one of the imaging devices to prevent collection of debris thereon.

12. A method for inspecting a smoking article comprising a smokable rod and a filter element connected by a tipping material, the method comprising:
   capturing one or more images in a visible light spectrum of an exterior surface of the smoking article as the smoking article is supported in a groove defined by a circumferential surface of a drum and oriented parallel to a rotational axis of the drum, the one or more imaging devices being positioned to capture the plurality of images substantially perpendicular to the rotational axis of the drum;
   determining a position of the smoking article based on an edge location of the smoking article; and
   determining whether the smoking article is defective after the position of the smoking article is determined.

13. The method of claim 12, further comprising determining a second edge location of the smoking article to determine a plurality of boundaries of the smoking article.

14. The method of claim 12 wherein determining whether the smoking article is defective comprises at least one of:
   determining an edge location of the tipping material;
   detecting a plurality of perforations extending through the tipping material;
   detecting a contrast between a dark portion and a light portion of the smoking article;
   determining a color of the smoking article;
   detecting a pattern; and
   identifying segments of the filter element.

15. The method of claim 12, wherein capturing the one or more images in the visible light spectrum of the exterior surface of the smoking article comprises at least one of:
   capturing the one or more images of a longitudinal length of a two-up filtered smoking article assembly during application of the tipping material thereto;
   capturing the one or more images of the longitudinal length of the two-up filtered smoking article assembly after creation of a plurality of perforations extending through the tipping material;
   capturing the one or more images of the longitudinal length of the smoking article after division of the two-up filtered smoking article assembly; and
   capturing the one or more images of a terminus of the smoking article.

16. The method of claim 12, further comprising directing a flow of air proximate one or more imaging devices configured to capture the one or more images to prevent collection of debris thereon.

17. A method for inspecting a smoking article comprising a smokable rod and a filter element connected by a tipping material, the method comprising:
   capturing a plurality of images in a visible light spectrum of an exterior surface of the smoking article during assembly of the smoking article as the smoking article is supported in a groove defined by a circumferential surface of a drum and oriented parallel to a rotational axis of the drum, the one or more imaging devices being positioned to capture the plurality of images substantially perpendicular to the rotational axis of the drum, wherein assembly of the smoking article comprises a plurality of operations;
   determining whether the smoking article is defective from the images thereof; and
   if the smoking article is determined to be defective, determining the one of the operations causing damage to the smoking article from analysis of the images of the smoking article captured during assembly.

18. The method of claim 17, further comprising determining a position of the smoking article based on an edge location of the smoking article before determining whether the smoking article is defective.

19. The method claim 18, further comprising determining a second edge location of the smoking article to determine a plurality of boundaries of the smoking article.

20. The method of claim 17, wherein determining whether the smoking article is defective comprises at least one of:
   determining an edge location of the tipping material;
   detecting a plurality of perforations extending through the tipping material;
   detecting a contrast between a dark portion and a light portion of the smoking article;

determining a color of the smoking article;
detecting a pattern; and
identifying segments of the filter element.

21. The method of claim 17, wherein capturing the one or more images in the visible light spectrum of the exterior surface of the smoking article comprises at least one of:
capturing the one or more images of a longitudinal length of a two-up filtered smoking article assembly during application of the tipping material thereto;
capturing the one or more images of the longitudinal length of the two-up filtered smoking article assembly after creation of a plurality of perforations extending through the tipping material;
capturing the one or more images of the longitudinal length of the smoking article after division of the two-up filtered smoking article assembly; and
capturing the one or more images of a terminus of the smoking article.

22. The method of claim 17, further comprising directing a flow of air proximate one or more imaging devices configured to capture the one or more images to prevent collection of debris thereon.

\* \* \* \* \*